US012757166B2

(12) United States Patent
Yokomakura et al.

(10) Patent No.: US 12,757,166 B2
(45) Date of Patent: Oct. 6, 2026

(54) WAVEFORM PART CONFIGURATIONS FOR V2X COMMUNICATION

(71) Applicant: SHARP KABUSHIKI KAISHA, Sakai City (JP)

(72) Inventors: Kazunari Yokomakura, Sakai City (JP); Tatsushi Aiba, Sakai City (JP); Jia Sheng, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 803 days.

(21) Appl. No.: 17/280,842

(22) PCT Filed: Sep. 26, 2019

(86) PCT No.: PCT/JP2019/037974
§ 371 (c)(1),
(2) Date: Mar. 26, 2021

(87) PCT Pub. No.: WO2020/067343
PCT Pub. Date: Apr. 2, 2020

(65) Prior Publication Data

US 2021/0410111 A1 Dec. 30, 2021

Related U.S. Application Data

(60) Provisional application No. 62/737,777, filed on Sep. 27, 2018.

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04L 27/26025* (2021.01); *H04W 72/044* (2013.01)

(58) Field of Classification Search
CPC ............... H04W 72/02; H04W 72/044; H04W 72/0453; H04L 5/0044; H04L 5/0051;
(Continued)

(56) References Cited

U.S. PATENT DOCUMENTS

| | | | | |
|---|---|---|---|---|
| 9,888,505 | B2 * | 2/2018 | Zhang | H04L 5/0005 |
| 11,026,217 | B2 * | 6/2021 | Chae | H04L 5/00 |

(Continued)

FOREIGN PATENT DOCUMENTS

| | | | |
|---|---|---|---|
| EP | 3836675 | A1 | 6/2021 |
| KR | 2017-0053436 | A | 5/2017 |
| WO | 2020/022752 | A1 | 1/2020 |

OTHER PUBLICATIONS

Nokia et al., "Initial View on NR v2x Sidelink Physical Layer Structures and Procedures", R1-1809045, 3GPP TSG RAN WG1 Meeting #94, Gothenburg, Sweden, Aug. 20-24, 2018.

(Continued)

*Primary Examiner* — Syed Ali
(74) *Attorney, Agent, or Firm* — ScienBiziP, P.C.

(57) ABSTRACT

A user equipment (UE), comprising: higher layer circuitry configured to receive information to configure a sidelink bandwidth part (BWP) and second information to configure one or more resource pool for sidelink transmission and/or reception; transmitting circuitry configured to transmit a physical sidelink control channel (PSCCH) and a physical sidelink shared channel (PSSCH), wherein subcarrier spacing is associated with the sidelink BWP, and a demodulation reference signal configuration for the PSCCH and PSSCH is configured for each of the one or more resource pools.

4 Claims, 18 Drawing Sheets

(51) Int. Cl.
*H04L 27/26* (2006.01)
*H04W 72/044* (2023.01)

(58) Field of Classification Search
CPC ............ H04L 5/0053; H04L 27/26025; H04L 5/0094
See application file for complete search history.

(56) References Cited

U.S. PATENT DOCUMENTS

| | | | | |
|---|---|---|---|---|
| 2018/0048446 | A1 | 2/2018 | Jiang et al. | |
| 2018/0255444 | A1* | 9/2018 | Chae | H04W 4/44 |
| 2018/0279327 | A1* | 9/2018 | Ying | H04W 72/0446 |
| 2019/0387377 | A1* | 12/2019 | Zhang | H04W 52/383 |
| 2019/0394759 | A1* | 12/2019 | Ying | H04L 1/0061 |
| 2020/0112400 | A1* | 4/2020 | Lee | H04L 5/0055 |
| 2021/0243773 | A1* | 8/2021 | Osawa | H04L 5/0053 |

OTHER PUBLICATIONS

Panasonic, "Discussion on physical layer structures and procedure(s) of NR sidelink", R1-1808647, 3GPP TSG RAN WG1 Meeting #94, Gothenburg, Sweden, Aug. 20-24, 2018.
NTT Docomo, Inc., "Physical layer structures and procedure(s)", R1-1809157, 3GPP TSG RAN WG1 Meeting #94, Gothenburg, Sweden, Aug. 20-24, 2018.
Huawei, Hisilicon, "Summary of AI: 7.2.4.3 Uu-based sidelink resource allocation/configuration", R1-1809878, 3GPP TSG RAN WG1 Meeting #94, Gothenburg, Sweden, Aug. 20-24, 2018.
Sony, "Resource pool configurations on LTE sidelink for V2V services", R1-160679, 3GPP TSG RAN WG1 Meeting #84, St Julian's, Malta, Feb. 15, 2016-Feb. 19, 2016, XP051054007, Retrieved from the Internet: URL: http://www.3gpp.org/ftp/Meetings_3GPP_SYNC/RAN1/Docs/[retrieved on Feb. 14, 2016].
"3rd Generation Partnership Project; Technical Specification Group Radio Access Network; NR; Physical channels and modulation (Release 15)", 3GPP TS 38.211 V15.0.0(Dec. 2017), pp. 1-73, XP051392260, [retrieved on Jan. 3, 2018].

* cited by examiner

WAVEFORM PART CONFIGURATIONS FOR V2X COMMUNICATION

TECHNICAL FIELD

The present disclosure relates generally to communication systems. More specifically, the present disclosure relates to waveform configurations for V2X communication.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: higher layer circuitry configured to receive information to configure a sidelink bandwidth part (BWP) and second information to configure one or more resource pool for sidelink transmission and/or reception; transmitting circuitry configured to transmit a physical sidelink control channel (PSCCH) and a physical sidelink shared channel (PSSCH), wherein subcarrier spacing is associated with the sidelink BWP, and a demodulation reference signal configuration for the PSCCH and PSSCH is configured for each of the one or more resource pools.

In one example, a base station (gNB), comprising: higher layer circuitry configured to transmit information to configure a sidelink bandwidth part (BWP) and second information to configure one or more resource pool for sidelink communication; wherein subcarrier spacing is associated with the sidelink BWP, and a demodulation reference signal configuration for the PSCCH and PSSCH is configured for each of the one or more resource pools.

In one example, a communication method by a user equipment (UE), comprising: receiving information to configure a sidelink bandwidth part (BWP) and second information to configure one or more resource pool for sidelink transmission and/or reception; transmitting a physical sidelink control channel (PSCCH) and a physical sidelink shared channel (PSSCH), wherein subcarrier spacing is associated with the sidelink BWP, and a demodulation reference signal configuration for the PSCCH and PSSCH is configured for each of the one or more resource pools.

In one example, a communication method by a base station (gNB), comprising: transmitting information to configure a sidelink bandwidth part (BWP) and second information to configure one or more resource pool for sidelink communication; wherein subcarrier spacing is associated with the sidelink BWP, and a demodulation reference signal configuration for the PSCCH and PSSCH is configured for each of the one or more resource pools.

DESCRIPTION OF EMBODIMENTS

Figure 1:
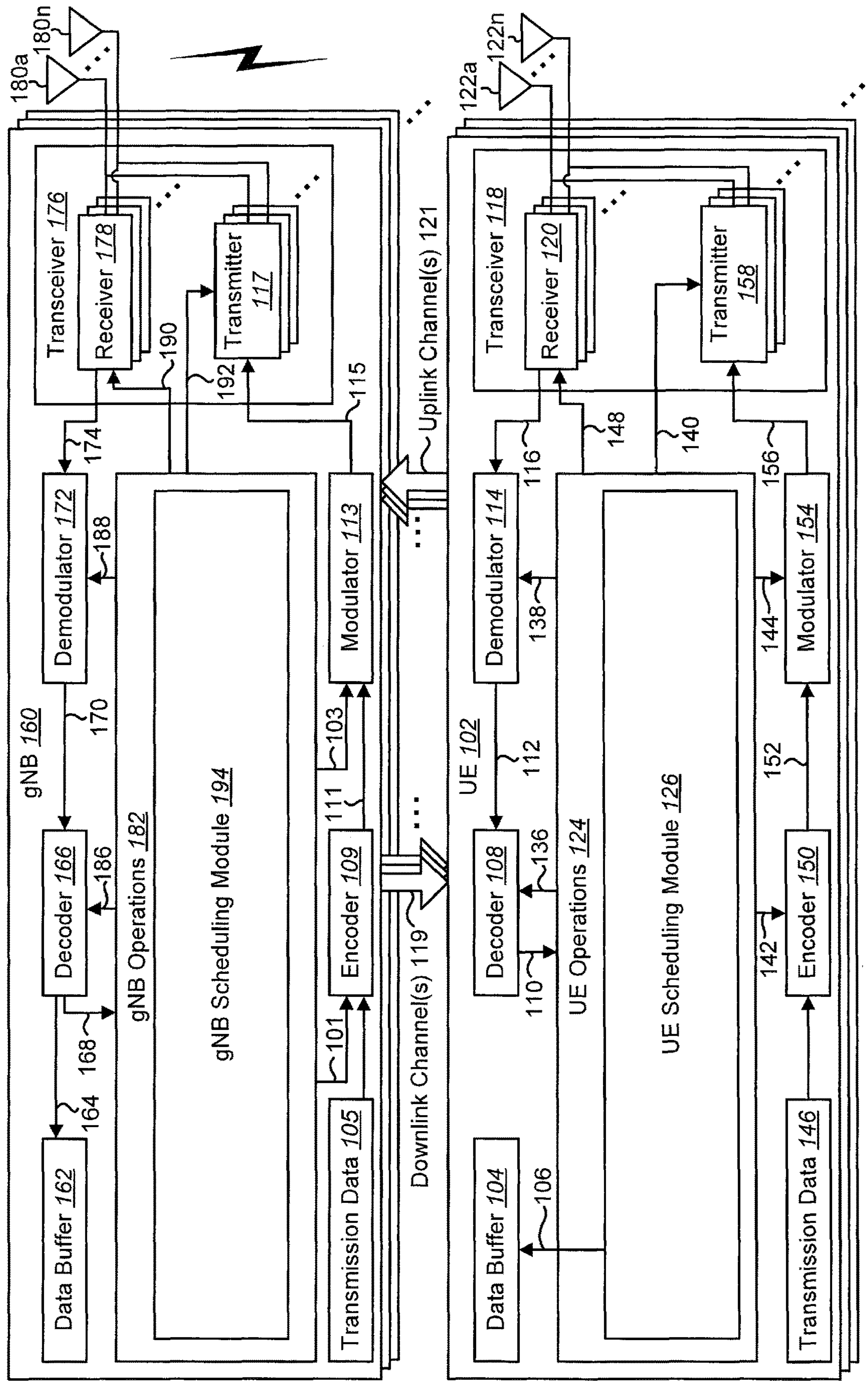
FIG. 1 is a block diagram illustrating one implementation of one or more base stations (gNBs) and one or more user equipments (UEs) in which waveform configurations for V2X communication may be implemented.

A user equipment (UE) is described. The UE includes higher layer circuitry configured to receive information on a resource pool for sidelink. The UE also includes transmitting circuitry configured to transmit a physical sidelink control channel (PSCCH) and a physical sidelink shared channel (PSSCH). The information on the resource pool includes information on whether a transmission precoding is enabled or disabled. The transmitting circuitry is also configured to transmit the PSSCH based on whether the transmission precoding is enabled or disabled.

A base station (gNB) is also described. The gNB includes transmitting circuitry configured to transmit information on a resource pool for sidelink. The gNB also includes receiving circuitry configured to receive a PSCCH and a PSSCH. The information on the resource pool includes information on whether a transmission precoding is enabled or disabled. The receiving circuitry is also configured to receive the PSSCH based on whether the transmission precoding is enabled or disabled.

A communication method by a UE is also described. The method includes receiving information on a resource pool for sidelink. The method also includes transmitting a PSCCH and a PSSCH. The information on the resource pool includes information on whether a transmission precoding is enabled or disabled. The method further includes transmitting the PSSCH based on whether the transmission precoding is enabled or disabled.

A communication method by a gNB is also described. The method includes transmitting information on a resource pool for sidelink. The method also includes receiving a PSCCH and a PSSCH. The information on the resource pool includes information on whether a transmission precoding is enabled or disabled. The method further includes receiving the PSSCH based on whether the transmission precoding is enabled or disabled.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 in which waveform configurations for V2X communication may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform waveform configurations for V2X communication. 3GPP V2X services will be used to transport SAE J2735 Basic Safety Message (s) (BSM). The BSM has two parts: part 1 contains the core data elements (e.g., vehicle size, position, speed, heading acceleration, brake system status), and is transmitted approximately 10 times per second. Part 2 contains a variable set of data elements drawn from many optional data elements, and is transmitted less frequently than part 1. The BSM is expected to have a transmission range of ~1,000 meters, and is tailored for localized broadcast required by V2V safety applications.

In Rel-14 LTE V2X (also known as LTE V2X), a basic set of requirements for V2X service in TR 22.885 is supported, which are considered sufficient for basic road safety service. An LTE V2X enabled vehicle (e.g., a vehicle configured with a UE 102 that supports V2X applications) can directly exchange status information via the PC5 interface. It should be noted that sidelink defines the procedures for realizing a singlehop UE-UE communication, similar to Uplink and Downlink, which define the procedures for UE-base station (BS) and BS-UE access, respectively. Along the same lines, PC5 was introduced as the new direct UE interface, similar to the Uu (UE-BS/BS-UE) interface. Thus, the PC5 interface is also known as sidelink at the physical layer such as position, speed and heading, with other nearby vehicles, infrastructure nodes and/or pedestrians that are also enabled with LTE V2X.

Rel-16 NR provides higher throughput, lower latency and higher reliability as compared to LTE, via a combination of enchantments to protocol numerology, usage of higher frequency bands (e.g., mm Wave Frequencies) and a selection of wider sub carrier spacings (SCS) (e.g., 30 kHz, 60 kHz, 120 kHz, and/or 240 kHz, in addition to the 15 kHz used by LTE) to match the higher frequency bands, and process for beam management (BM). Rel-16 NR is expected to provide an enhanced V2X service (also referred to as NR V2X) that leverages the higher throughput, lower latency and higher reliability provided by Rel-16 NR data transport services.

Therefore, it is desirable to enable a process in the NR V2X UE 102 that configures the physical layer to transmit different transmission beams, with different SCS, according to the available V2X frequency bands.

In NR, there are roughly two large frequency ranges specified in 3GPP. One is below 6 GHz (also referred to as sub 6 GHz or FR1). The other is above 6 GHz (also referred to as millimeter wave or FR2. Depending on the frequency ranges, the maximum bandwidth and subcarrier spacing varies. In FR1, the maximum bandwidth is 100 MHz and in the FR2 range the maximum bandwidth is 400 MHz. Some subcarrier spacing (e.g., 15 kHz and 30 kHz) can be used only in FR1 and some subcarrier spacing (e.g., 120 kHz and 240 kHz) can be used in FR2 only, and some subcarrier spacing (e.g., 60 kHz) can be used both in the FR1 and FR2 range.

As mentioned above, two types of frequency ranges are defined in 3GPP. Sub 6 GHz range is called FR1, and millimeter wave range is called FR2. The exact frequency range for FR1 (sub 6 GHz) and FR2 (millimeter wave) may be defined as in Table 1. Table 2 provides examples of NR operating bands in FR1. Table 3 provides examples of NR operating bands in FR2. Table 4 provides applicable synchronization signal (SS) raster entries per operating band (FR1). Table 5 provides applicable SS raster entries per operating band (FR2).

TABLE 1

| Frequency Range Designation | Corresponding Frequency Range |
|---|---|
| FR1 | 450 MHz-6000 MHz |
| FR2 | 24,250 MHz-52,600 MHz |

TABLE 2

| NR Operating Band | Uplink (UL) operating band BS receive UE transmit $F_{UL\_low}$-$F_{UL\_high}$ | Total BW | Downlink (DL) operating band BS transmit UE receive $F_{UL\_low}$-$F_{UL\_high}$ | total BW | Duplex Mode |
|---|---|---|---|---|---|
| n1 | 1920 MHz-1980 MHz | 60 | 2110 MHz-2170 MHz | 60 | FDD |
| n2 | 1850 MHz-1910 MHz | 60 | 1930 MHz-1990 MHz | 60 | FDD |
| n3 | 1710 Mhz-1785 MHz | 75 | 1805 MHz-1880 MHz | 75 | FDD |
| n5 | 824-849 MHz | 25 | 869 MHz-894 MHz | 25 | FDD |
| n7 | 2500 MHz-2570 MHz | 70 | 2620 MHz-2690 MHz | 70 | FDD |
| n8 | 880 MHz-915 MHz | 35 | 925 MHz-960 MHz | 35 | FDD |
| n20 | 832 MHz-862 MHz | 30 | 791 MHz-821 MHz | 30 | FDD |
| n28 | 703 MHz-748 MHz | 45 | 758 MHz-803 MHz | 45 | FDD |
| n38 | 2570 MHz-2620 MHz | 50 | 2570 MHz-2620 MHz | 50 | TDD |
| n41 | 2496 MHz-2690 MHz | 194 | 2496 MHz-2690 MHz | 194 | TDD |
| n50 | 1432 MHz-1517 MHz | 85 | 1432 MHz-1517 MHz | 85 | TDD |
| n51 | 1427 MHz-1432 MHz | 5 | 1427 MHz-1432 MHz | 5 | TDD |
| n66 | 1710 MHz-1780 MHz | 70 | 2110 MHz-2200 MHz | 90 | FDD |
| n70 | 1695 MHz-1710 MHz | 15 | 1995 MHz-2020 MHz | 25 | FDD |
| n71 | 663 MHz-698 MHz | 35 | 617 MHz-652 MHz | 35 | FDD |
| n74 | 1427 MHz-1470 MHz | 43 | 1475 MHz-1518 MHz | 43 | FDD |
| n75 | N/A | | 1432 Mhz-1517 MHz | 85 | SDL |
| n76 | N/A | | 1427 Mhz-1432 MHz | 5 | SDL |
| n78 | 3300 MHz-3800 MHz | 500 | 3300 MHz-3800 MHz | 500 | TDD |
| n77 | 3300 MHz-4200 MHz | 900 | 3300 MHz-4200 MHz | 900 | TDD |
| n79 | 4400 MHz-5000 MHz | 600 | 4400 MHz-5000 MHz | 600 | TDD |
| n80 | 1710 MHz-1785 MHz | 75 | N/A | | SUL |
| n81 | 880 MHz-915 MHz | 35 | N/A | | SUL |
| n82 | 832 MHz-862 MHz | 30 | N/A | | SUL |
| n83 | 703 MHz-748 MHz | 45 | N/A | | SUL |
| n84 | 1920 MHz-1980 MHz | 60 | N/A | | SUL |

TABLE 3

| NR Operating Band | Uplink (UL) operating band BS receive UE transmit $F_{UL\_low}$-$F_{UL\_high}$ | total BW | Downlink (DL) operating band BS transmit UE receive $F_{UL\_low}$-$F_{UL\_high}$ | total BW | Duplex Mode |
|---|---|---|---|---|---|
| n257 | 26500 MHz-29500 MHz | 3000 | 26500 MHz-29500 MHz | 3000 | TDD |
| n258 | 24250 MHz-27500 MHz | 3260 | 24250 MHz-27500 MHz | 3260 | TDD |
| n260 | 37000 MHz-40000 MHz | 3000 | 37000 MHz-40000 MHz | 3000 | TDD |

TABLE 4

| NR Operating Band | SS Block SCS | SS Block pattern | Range of GSCN (First-<Step size>-Last) |
|---|---|---|---|
| n1 | 15 kHz | Case A | [7039-<1>-7224] |
| n2 | 15 kHz | Case A | [6439-<1>-6624] |
| n3 | 15 kHz | Case A | [6022-<1>-6258] |
| n5 | 15 kHz | Case A | [2902-<1>-2973] |
| | 30 kHz | Case B | [2911-<1>-2964] |
| n7 | 15 kHz | Case A | [8740-<1>-8958] |
| n8 | 15 kHz | Case A | [3091-<1>-3192] |
| n20 | 15.kHz | Case A | [2644-<1>-2727] |
| n28 | 15 kHz | Case A | [2533-<1>-2667] |
| n38 | 15 kHz | Case A | [8572-<1>-8958] |
| n41 | 15 kHz | Case A | [9069]-<TBD>-[9199] |
| | 30 kHz | Case C | [9070-<1>-9198] |
| n50 | 15 kHz | Case A | [4780-<1>-5049] |
| n51 | 15 kHz | Case A | [4762-<1>-4764] |
| n66 | 15 kHz | Case A | [7039-<1>-[7326] |
| | 30 kHz | Case B | [7048-<1>-[7317] |
| n70 | 15 kHz | Case A | [6655-<1>-[6726] |
| n71 | 15 kHz | Case A | [2062-<1>-2166] |
| n74 | 15 kHz | Case A | [4924-<1>-5052] |
| n75 | 15 kHz | Case A | [4780-<1>-5049] |
| n76 | 15 kHz | Case A | [4762-<1>-4764] |
| n77 | 30 kHz | Case C | [9628-<1>-10247] |
| n78 | 30 kHz | Case C | [9628-<1>-9969] |
| n79 | 30 kHz | Case C | [10393]-<TBD>-[10802] |

TABLE 5

| NR Operating Band | SS Block SCS | SS Block pattern | Range of GSCN (First-<Step size>-Last) |
|---|---|---|---|
| n257 | 120 kHz | Case D | [24306-<1>-24476] |
| | 240 kHz | Case E | [24308-<2>-24474] |
| n258 | 120 kHz | Case D | [24175-<1>-24361] |
| | 240 kHz | Case E | [24176-<2>-24360] |
| n260 | 120 kHz | Case D | [24913-<1>-25084] |
| | 240 kHz | Case E | [24916-<2>-25080] |

The systems and methods described herein cover aspects for reference configurations (RS) for V2X communication in FR1 and FR2. Enhancements to NR V2X (e.g., 3GPP Rel-16 V2X, V2X service) for reference signal configurations of a physical sidelink control channel (PSCCH) and/or a physical sidelink shared channel (PSSCH) are described herein.

Figure 2:
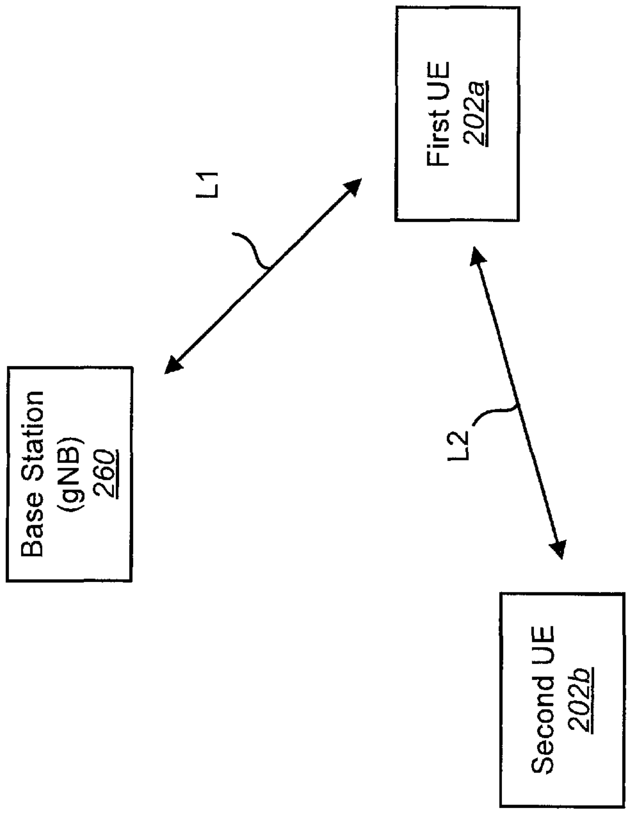
FIG. 2 is an example illustrating V2X services.

A demodulation reference signal may be configured by system information block(s) (SIB(s)) or by dedicated radio resource control (RRC) message(s). In addition, a UE 102 may be configured with one or multiple resource pools. A demodulation reference signal configuration may be associated with each resource pool. Furthermore, NR supports two types of waveform: one waveform is CP-OFDM and the other waveform is DFT-S-OFDM. Each resource pool may be associated with a type of waveform. An example of V2X services is illustrated in FIG. 2.

For a radio link between a base station (gNB) 160 and a first or second UE 102, the following physical channels may be used (downlink is a transmission direction from gNB 160 to UE 102, and uplink is a transmission direction from UE 102 to gNB 160): physical broadcast channel (PBCH); physical downlink control channel (PDCCH); physical downlink shared channel (PDSCH); physical uplink control channel (PUCCH); and/or physical uplink shared channel (PUSCH).

A PBCH may be used for broadcasting essential system information. A PBCH may include master information block (MIB) and some other information. A PDCCH may be used for transmitting control information in the downlink and the PDCCH may include downlink control information (DCI). A PDSCH may be used for transmitting remaining minimum system information (RMSI), other system information (OSI), paging, and downlink data (DL-SCH (downlink shared channel)). A PUCCH may be used for transmitting uplink control information (UCI). A PUSCH may be used for transmitting uplink data (UL-SCH (uplink shared channel) and the PUSCH may be used for transmitting UCI.

For the radio link between a base station (gNB) 160 and a first or second UE 102, the following physical signals may be used: primary synchronization signal (PSS); secondary synchronization signal (SSS); tracking reference signal (TRS); channel state information reference signal (CSI-RS); demodulation reference signal (DMRS); phase tracking reference signal (PTRS); and/or sounding reference signal (SRS).

A PSS and a SSS may be used for time/frequency synchronization and determination/detection of a physical cell identity (PCID). The PSS, the SSS, and the PBCH may be multiplexed as a SS/PBCH block, and one or more SS/PBCH blocks may be transmitted in a serving cell. A TRS may be used for channel tracking at a UE side and transmitted in the downlink, and the TRS may be one configuration of a CSI-RS resource. A CSI-RS may be used for measuring channel state information (CSI) and transmitted in the downlink and a CSI-RS includes non-zero power CSI-RS for channel measurement or interference measurement, zero-power CSI-RS (ZP CSI-RS) for interference measurement. A DMRS may be used for demodulation of physical channels, and the DMRS may be defined for each channel. A PTRS may be used for phase tracking to compensate phase noise and transmitted with DMRS and PDSCH/PUSCH. The PTRS may be configured in FR2. A SRS may be used for channel sounding in the uplink.

DCI may include scheduling information of a PDSCH or a PUSCH, the timing of HARQ-ACK (hybrid automatic repeat request-acknowledgement) bit(s), and modulation and coding schemes (MCS), DMRS port information, and so on. UCI may include HARQ-ACK bits and CSI. CSI may include one or more of CQI (channel quality indicator), PMI (precoding matrix indicator), RI (rank indicator), LI (layer indicator), and CRI (CSI-RS index).

For support of V2X communication, the following physical channels may be defined: physical sidelink broadcast channel (PSBCH); physical sidelink control channel (PSCCH); and/or physical sidelink shared channel (PSSCH).

PSBCH may be used for transmitting information on sidelink frame number, and so on. PSCCH may be used for indicating sidelink control information (SCI), and SCI may indicate resource allocation (scheduling) information of resource(s) for a PSSCH, modulation and coding schemes, redundancy version(s). A transmitter of a first UE 102 (e.g., UE 1) may transmit PSCCH to a receiver UE 102 (e.g., UE 2).

For support of V2X communication, the following physical signals may be defined: primary sidelink synchronization signal (PSSS); secondary sidelink synchronization signal (SSSS); tracking reference signal (TRS); channel state information reference signal (CSI-RS); demodulation reference signal (DMRS); phase tracking reference signal (PTRS); and/or sounding reference signal (SRS). A PSSS and a SSSS may be used for time/frequency synchronization and determination/detection of a synchronization source identity (ID), and the PSSS, the SSSS, and the PSBCH may be multiplexed as a SSS/PSBCH block.

Numerologies, frame and slot structures, resource blocks (RBs), bandwidth parts (BWPs) are also described herein. In this disclosure, unless otherwise noted, the size of various fields in the time domain is expressed in time units $T_c=1/(\Delta f_{max}\cdot N_f)$ where $\Delta f_{max}=480\cdot 10^3$ Hz and $N_f=4096$. The constant $x=T_s/T_c=64$ where $T_s=1/(\Delta f_{ref}\cdot \Delta f_{ref})$, $\Delta f_{ref}=15\cdot 10^3$ Hz and $N_{f,ref}=2048$.

Multiple OFDM numerologies are supported as given by Table 6 where μ and the cyclic prefix for a bandwidth part are obtained from the higher-layer parameter subcarrier-Spacing and cyclicPrefix, respectively.

TABLE 6

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Uplink-downlink timing relation and transition time between transmission and reception, and reception to transmission are described herein. Downlink and uplink transmissions may be organized into frames with $T_f=(\Delta f_{max} N_f/1000)\cdot T_c=10$ ms duration, each including ten subframes of $T_{sf}=(\Delta f_{max}N_f 11000)\cdot T_c=1$ ms duration. The number of consecutive OFDM symbols per subframe may be $$N_{symb}^{subframe,\mu} = N_{symb}^{slot} N_{slot}^{subframe,\mu}.$$

Figure 3:
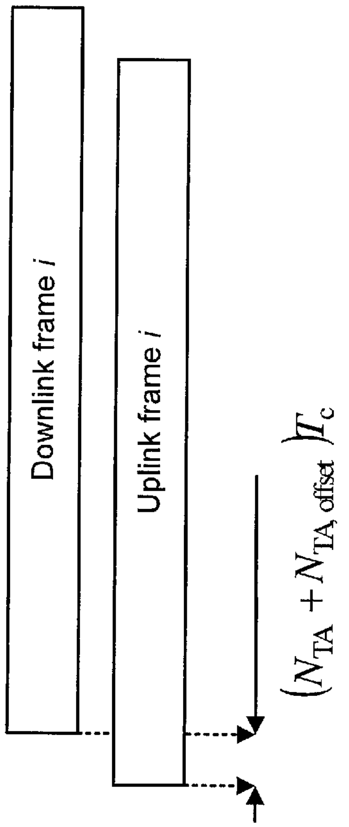
FIG. 3 illustrates an uplink-downlink timing relation.

Each frame may be divided into two equally-sized half-frames of five subframes each with half-frame 0 including subframes 0-4 and half-frame 1 including subframes 5-9. There may be one set of frames in the uplink and one set of frames in the downlink on a carrier. FIG. 3 illustrates an uplink-downlink timing relation. Table 7 illustrates the transition time between transmission and reception ($N_{TX\_RX}$) and the transition time between reception and transmission ($N_{RX\_TX}$) for FR1 and FR2.

TABLE 7

| Transition Time | FR1 | FR2 |
|---|---|---|
| $N_{TX\_RX}$ | 25600 | 13792 |
| $N_{RX\_TX}$ | 25600 | 13792 |

Uplink frame number i for transmission from the UE 102 may start $N_{TA}=(N_{TA}+N_{TA,offset})T_c$ before the start of the corresponding downlink frame at the UE 102. $N_{TA,offset}$ is given by Table 7.

For subcarrier spacing configuration μ, slots may be numbered $$n_s^\mu \in \{0, \ldots, N_{slot}^{subframe,\mu} - 1\}$$

in increasing order within a subframe and $$n_{s,f}^\mu \in \{0, \ldots, N_{slot}^{frame,\mu} - 1\}$$

in increasing order within a frame. There are $$N_{symb}^{slot}$$

consecutive OFDM symbols in a slot, where $$N_{symb}^{slot}$$

depends on the cyclic prefix as given by Tables 8 and 9, respectively. The start of slot $$n_s^\mu$$

in a subframe is aligned in time with the start of OFDM symbol $$n_s^\mu N_{symb}^{slot}$$

in the same subframe. Tables 8 depicts the number of OFDM symbols per slot, slots per frame, and slots per subframe for normal cyclic prefix. Table 9 depicts the number of OFDM symbols per slot, slots per frame, and slots per subframe for extended cyclic prefix.

TABLE 8

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 9

| μ | $N_{symb}^{slot}$ | $N_{slot}^{frame,\mu}$ | $N_{slot}^{subframe,\mu}$ |
|---|---|---|---|
| 2 | 12 | 40 | 4 |

OFDM symbols in a slot can be classified as "downlink", "flexible", or "uplink". In a slot in a downlink frame, the UE 102 may assume that downlink transmissions only occur in "downlink" or "flexible" symbols. In a slot in an uplink frame, the UE 102 may only transmit in "uplink" or "flexible" symbols.

A UE 102 not capable of full-duplex communication is not expected to transmit in the uplink earlier than $N_{Rx\text{-}Tx}T_c$ after the end of the last received downlink symbol in the same cell where $N_{Rx\text{-}Tx}$ is given by Table 7. A UE 102 not capable of full-duplex communication is not expected to receive in the downlink earlier than $N_{Tx\text{-}Rx}T_c$ after the end of the last transmitted uplink symbol in the same cell where $N_{Tx\text{-}Rx}$ is given by Table 7.

An antenna port may be defined such that the channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DMRS symbol on the same antenna port is conveyed only if the two symbols are within the same resource as the scheduled PDSCH, in the same slot, and in the same Physical resource block group (PRG).

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

For each numerology and carrier, a resource grid of $$N_{grid,x}^{size,\mu} N_{sc}^{RB}$$

subcarriers and $$N_{symb}^{subframe,\mu}$$

OFDM symbols may be defined, starting at common resource block $$N_{grid}^{start,\mu}$$

indicated by higher-layer signalling. There may be one set of resource grids per transmission direction (uplink or downlink) with the subscript x set to DL and UL for downlink and uplink, respectively. When there is no risk for confusion, the subscript x may be dropped. There may be one resource grid for a given antenna port p, subcarrier spacing configuration μ, and transmission direction (downlink or uplink).

The carrier bandwidth $$N_{grid}^{size,\mu}$$

for subcarrier spacing configuration μ may be given by the higher-layer parameter carrierBandwidth in the SCS-SpecificCarrier IE. The starting position $$N_{grid}^{start,\mu}$$

for subcarrier spacing configuration μ may be given by the higher-layer parameter offsetToCarrier in the SCS-SpecificCarrier IE.

The frequency location of a subcarrier refers to the center frequency of that subcarrier. For the downlink, the higher-layer parameter DirectCurrentLocation in the SCS-SpecificCarrier IE may indicate the location of the transmitter DC subcarrier in the downlink for each of the numerologies configured in the downlink. Values in the range 0-3299 represent the number of the DC subcarrier and the value 3300 indicates that the DC subcarrier is located outside the resource grid.

For the uplink, the higher-layer parameter DirectCurrentLocation in the UplinkTxDirectCurrentBWP IE may indicate the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

Each element in the resource grid for antenna port p and subcarrier spacing configuration μ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $$a_{k,l}^{(p,\mu)}.$$

When there is no risk for confusion, or no particular antenna port or subcarrier spacing is specified, the indices p and μ may be dropped, resulting in $$a_{k,l}^{(p)} \text{ or } a_{k,l}.$$

In the downlink, the OFDM access scheme with cyclic prefix (CP) may be employed, which may be also referred to as CP-OFDM. A downlink radio frame may include multiple pairs of downlink resource blocks (RBs), which is also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. Additionally or alternatively, the downlink RB may include twelve sub-carriers in frequency domain and seven (for normal CP) or six (for extended CP) OFDM symbols in time domain. A region defined by one sub-carrier in frequency domain and one OFDM symbol in time domain may be referred to as a resource element (RE) and may be uniquely identified by the index pair (k,l), where k and l are indices in the frequency and time domains, respectively.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain may be referred to as a resource element (RE) and may be uniquely identified by the index pair (k,l) in a slot, where k and l are indices in the frequency and time domains respectively. CP-OFDM may be defined as the case that transform precoding is not enabled/disabled. DFT-S-OFDM may be defined as the case that transform precoding is enabled.

Point A is also described herein. A resource block is defined as $$N_{sc}^{RB}=12$$

consecutive subcarriers in the frequency domain. Point A serves as a common reference point for resource block grids and may be obtained from the following. offsetToPointA for a PCell downlink represents the frequency offset between point A and the lowest subcarrier of the lowest resource block overlapping with the SS/PBCH block used by the UE for initial cell selection, expressed in units of resource blocks assuming 15 kHz subcarrier spacing for FR1 and 60 kHz subcarrier spacing for FR2. absoluteFrequencyPointA for all other cases where absoluteFrequencyPointA represents the frequency-location of point A expressed as in ARFCN.

Common resource blocks are numbered from 0 and upwards in the frequency domain for subcarrier spacing configuration μ. The center of subcarrier 0 of common resource block 0 for subcarrier spacing configuration μ may coincide with point A. The relation between the common resource block number $$n_{CRB}^{\mu}$$

in the frequency domain and resource elements (k,l) for subcarrier spacing configuration μ may be given by $$n_{CRB}^{\mu}=\left\lfloor k/N_{sc}^{RB}\right\rfloor$$

where k is defined relative to point A such that k=0 corresponds to the subcarrier centered around point A.

Physical resource blocks may be defined within a bandwidth part and numbered from 0 to $$N_{BWP,i}^{size}-1$$

where i is the number of the bandwidth part. The relation between the physical resource block $n_{PRB}$ in bandwidth part i and the common resource block $n_{CRB}$ is given by $$n_{CRB}=n_{PRB}+N_{BWP,i}^{start}\text{ where }N_{BWP,i}^{size}$$

is the common resource block where bandwidth part starts relative to common resource block 0.

Virtual resource blocks may be defined within a bandwidth part and numbered from 0 to $$N_{BWP,i}^{size}-1.$$

In this case, i is the number of the bandwidth part.

A bandwidth part is a subset of contiguous common resource blocks for a given numerology $\mu_i$ in bandwidth part i on a given carrier. The starting position $$N_{BWP,i}^{start,\mu}$$

and the number of resource blocks $$N_{BWP,i}^{size,\mu}$$

in a bandwidth part may fulfil $$N_{grid,x}^{start,\mu}\le N_{BWP,i}^{start,\mu}<N_{grid,x}^{start,\mu}+N_{grid,x}^{size,\mu}\text{ and}$$

$$N_{grid,x}^{start,\mu}<N_{BWP,i}^{size,\mu}+N_{BWP,i}^{start,\mu}\le N_{grid,x}^{start,\mu}+N_{grid,x}^{size,\mu},\text{ respectively.}$$

A UE 102 can be configured with up to four bandwidth parts in the downlink with a single downlink bandwidth part being active at a given time. The UE 102 is not expected to receive PDSCH, PDCCH, or CSI-RS (except for RRM) outside an active bandwidth part.

A UE 102 can be configured with up to four bandwidth parts in the uplink with a single uplink bandwidth part being active at a given time. If a UE 102 is configured with a supplementary uplink, the UE 102 can in addition be configured with up to four bandwidth parts in the supplementary uplink with a single supplementary uplink bandwidth part being active at a given time. The UE 102 may not transmit PUSCH or PUCCH outside an active bandwidth part. For an active cell, the UE 102 may not transmit SRS outside an active bandwidth part. Unless otherwise noted, the description in this disclosure applies to each of the bandwidth parts.

Configuration of BWP is also described herein. A UE 102 configured for operation in bandwidth parts (BWPs) of a serving cell, may be configured by higher layers for the serving cell with a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink.

If a UE 102 is not provided higher layer parameter initialDownlinkBWP, an initial active DL BWP may be defined by a location and number of contiguous PRBs, starting from a PRB with the lowest index and ending at a PRB with the highest index among PRBs of a control resource set for Type0-PDCCH common search space, and a subcarrier spacing and a cyclic prefix for PDCCH reception in the control resource set for Type0-PDCCH common search space. Otherwise, the initial active DL BWP may be provided by higher layer parameter initialDownlinkBWP. For operation on the primary cell or on a secondary cell, a UE 102 may be provided an initial active UL BWP by higher layer parameter initialuplinkBWP. If the UE 102 is configured with a supplementary UL carrier, the UE 102 may be provided an initial UL BWP on the supplementary UL carrier by higher layer parameter initialUplinkBWP in supplementaryUplink.

If a UE 102 has a dedicated BWP configuration, the UE 102 may be provided by higher layer parameter firstActive-DownlinkBWP-Id a first active DL BWP for receptions and by higher layer parameter firstActiveUplinkBWP-Id a first active UL BWP for transmissions on the primary cell.

For each DL BWP or UL BWP in a set of DL BWPs or UL BWPs, respectively, the UE 102 may be provided the following parameters for the serving cell. A subcarrier spacing may be provided by higher layer parameter subcarrierSpacing. A cyclic prefix may be provided by higher layer parameter cyclicPrefix. A first PRB and a number of contiguous PRBs may be provided by higher layer parameter locationAndBandwidth that is interpreted as RIV, setting $$N_{BWP}^{size} = 275,$$

and the first PRB is a PRB offset relative to the PRB indicated by higher layer parameters offsetToCarrier and subcarrierSpacing. An index in the set of DL BWPs or UL BWPs may be provided by respective higher layer parameter bwp-Id. A set of BWP-common and a set of BWP-dedicated parameters may be provided by higher layer parameters bwp-Common and bwp-Dedicated.

For unpaired spectrum operation, a DL BWP from the set of configured DL BWPs with an index provided by higher layer parameter bwp-Id may be linked with an UL BWP from the set of configured UL BWPs with index provided by higher layer parameter bwp-Id when the DL BWP index and the UL BWP index are same. For unpaired spectrum operation, a UE 102 does not expect to receive a configuration where the center frequency for a DL BWP is different than the center frequency for an UL BWP when the bwp-Id of the DL BWP is same as the bwp-Id of the UL BWP.

For each DL BWP in a set of DL BWPs on the primary cell, a UE 102 may be configured with control resource sets for every type of common search space and for UE-specific search space. The UE 102 does not expect to be configured without a common search space on the PCell, or on the PSCell, of the MCG in the active DL BWP.

For each UL BWP in a set of UL BWPs of the PCell or of the PUCCH-SCell, the UE 102 may be provided configured resource sets for PUCCH transmissions. A UE 102 may receive PDCCH and PDSCH in a DL BWP according to a configured subcarrier spacing and CP length for the DL BWP. A UE 102 may transmit PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set. If a bandwidth part indicator field is configured in DCI format 0_1, the bandwidth part indicator field value indicates the active UL BWP, from the configured UL BWP set.

If a bandwidth part indicator field is configured in DCI format 0_1 or DCI format 1_1 and indicates an UL BWP or a DL BWP different from the active UL BWP or DL BWP, respectively, the UE 102 may, for each information field in the received DCI format 0_1 or DCI format 1_1 perform the following. If the size of the information field is smaller than the one required for the DCI format 0_1 or DCI format 1_1 interpretation for the UL BWP or DL BWP that is indicated by the bandwidth part indicator, respectively, the UE 102 may prepend zeros to the information field until its size is the one required for the interpretation of the information field for the UL BWP or DL BWP prior to interpreting the DCI format 0_1 or DCI format 1_1 information fields, respectively. If the size of the information field is larger than the one required for the DCI format 0_1 or DCI format 1_1 interpretation for the UL BWP or DL BWP that is indicated by the bandwidth part indicator, respectively, the UE 102 may use a number of least significant bits of DCI format 0_1 or DCI format 1_1 equal to the one required for the UL BWP or DL BWP indicated by a bandwidth part indicator prior to interpreting the DCI format 0_1 or DCI format 1_1 information fields, respectively. The UE 102 may also set the active UL BWP or DL BWP to the UL BWP or DL BWP indicated by the bandwidth part indicator in the DCI format 0_1 or DCI format 1_1, respectively.

A UE 102 does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a value (e.g., delay) required by the UE 102 for an active DL BWP change or UL BWP change.

If a UE 102 detects a DCI format 1_1 indicating an active DL BWP change for a cell, the UE 102 is not required to receive or transmit in the cell during a time duration from the end of the third symbol of a slot where the UE 102 receives the PDCCH that includes the DCI format 1_1 in a scheduling cell until the beginning of a slot indicated by the slot offset value of the time domain resource assignment field in the DCI format 1_1.

If a UE 102 detects a DCI format 0_1 indicating an active UL BWP change for a cell, the UE 102 is not required to receive or transmit in the cell during a time duration from the end of the third symbol of a slot where the UE 102 receives the PDCCH that includes the DCI format 0_1 in the scheduling cell until the beginning of a slot indicated by the slot offset value of the time domain resource assignment field in the DCI format 0_1.

A UE 102 may expect to detect a DCI format 0_1 indicating active UL BWP change, or a DCI format 1_1 indicating active DL BWP change, only if a corresponding PDCCH is received within the first 3 symbols of a slot.

For the primary cell, a UE 102 may be provided by higher layer parameter default-DownlinkBWP-Id with a default DL BWP among the configured DL BWPs. If a UE 102 is not provided a default DL BWP by higher layer parameter default-DownlinkBWP-Id, the default DL BWP is the initial active DL BWP.

If a UE 102 is configured for a secondary cell with higher layer parameter default-DownlinkBWP-Id indicating a default DL BWP among the configured DL BWPs and the UE 102 is configured with higher layer parameter bwp-InactivityTimer indicating a timer value, the UE procedures on the secondary cell may be the same as on the primary cell using the timer value for the secondary cell and the default DL BWP for the secondary cell.

If a UE 102 is configured by higher layer parameter bwp-InactivityTimer with a timer value for the primary cell and the timer is running, the UE 102 may increment the timer every interval of 1 millisecond for frequency range 1 or every 0.5 milliseconds for frequency range 2 if the restarting conditions are met during the interval.

If a UE 102 is configured by higher layer parameter bwp-InactivityTimer with a timer value for a secondary cell and the timer is running, the UE 102 may increment the timer every interval of 1 millisecond for frequency range 1 or every 0.5 milliseconds for frequency range 2 if the restarting conditions are not met during the interval.

For a cell where a UE 102 changes an active DL BWP due to a BWP inactivity timer expiration and for accommodating a delay in the active DL BWP change or the active UL BWP change required by the UE 102, the UE 102 is not required to receive or transmit in the cell during a time duration from the beginning of a subframe for frequency range 1, or of half of a subframe for frequency range 2, that is immediately after the BWP inactivity timer expires until the beginning of a slot where the UE 102 can receive or transmit.

If a UE 102 is configured by higher layer parameter firstActiveDownlinkBWP-Id with a first active DL BWP and by higher layer parameter firstActiveUplinkBWP-Id a first active UL BWP on a secondary cell or on a supplementary UL carrier, the UE 102 may use the indicated DL BWP and the indicated UL BWP as the respective first active DL BWP on the secondary cell and the first active UL BWP on the secondary cell or the supplementary UL carrier.

For paired spectrum operation, a UE 102 may not expect to transmit a PUCCH with HARQ-ACK information on a PUCCH resource indicated by a DCI format 1_0 or a DCI format 1_1 if the UE 102 changes its active UL BWP on the PCell between a time of a detection of the DCI format 1_0 or the DCI format 1_1 and a time of a corresponding PUCCH transmission with HARQ-ACK information. A UE 102 may not expect to monitor PDCCH when the UE 102 performs RRM measurements over a bandwidth that is not within the active DL BWP for the UE 102.

Transmissions in multiple cells may be aggregated. Unless otherwise noted, the description in this specification applies to each of the serving cells.

Some examples of V2X services are described herein. PSSCH may be used for transmitting sidelink shared channel (SL-SCH). SL-SCH may be the V2X data. As a resource for V2X communication, a resource pool may be defined. A base station (gNB) 160 may transmit information on a configuration of one or more resource pools by system information block(s) (SIB(s)) or dedicated radio resource control (RRC) message(s). A UE 102 may select one resource pool and a resource within a resource pool that is used for PSCCH and/or PSSCH. V2X service may be operated in uplink band(s).

A resource pool may be defined by a set of slots, subframes, or OFDM symbols, or groups of OFDM symbols. A transmitter UE 102 (e.g., UE1) may select the resources within the resource pool and the transmitter UE 102 may transmit a PSCCH and PSSCH associated with PSCCH. Here, which resource is selected by the transmitter UE 102, the gNB 160 may transmit information on a resource pool and the resource(s) within the resource pool. This information may be indicated via DCI, SIB, or dedicated RRC message. Alternately, the resource pool configuration may be preconfigured by each UE (e.g., UE1 or UE2). One or more resource pools for V2X transmission and one or more resource pools for V2X reception may be separately indicated via SIB, dedicated RRC message, MAC CE, or DCI.

Next, the resource pool configuration is explained. For each resource pool, the following information may be associated with all or part of the following information (e.g., resource pool information may include the following information elements to associated with V2X parameters): BWP identity (BWP ID); waveform (CP-OFDM or DFT-S-OFDM); DMRS type (e.g., DMRS type 1 and DMRS type 2 may be specified in the Uu interface, and which type is used for PSCCH or PSSCH); additional DMRS configuration; whether PT-RS is transmitted or not. In addition, PTRS density configuration (e.g., a threshold of MCS to determine time domain density (e.g., all OFDM symbols, every other OFDM symbol, and so on), and a threshold of the number of scheduled PRBs to determine frequency domain density (e.g., one subcarrier per RB, two subcarriers per RB, and so on)) may be associated with V2X parameters.

In addition, a configuration of a BWP may be used for parameters for V2X services. For instance, the parameters such as numerologies (subcarrier spacing), CP length, slot format (slot or mini-slot) may be configured as parameters for the configured BWP, and these parameters may be used for a resource pool for sidelink communication. In other words, parameters for a BWP corresponding to the BWP ID associated with a resource pool may be used for sidelink communication. BWP(s) for sidelink may be called SL BWP(s) (sidelink BWP). BWP(s) for sidelink may be configured as UL BWP(s) or DL BWP(s) to monitor PDCCH for sidelink resource scheduling. SL BWP may be associated with a UL BWP and/or a DL BWP.

Here, each BWP for V2X may be configured as one UL BWP. When UL BWP for V2X resource pool is not configured, one or more resource pools may be configured in the initial UL BWP or other predefined BWP. Additionally or alternately, the sidelink resource pool configuration may not be associated with a BWP ID. In this case, the other rule such as the starting PRB and the range of PRB length for the resource pool may be used. In other words, SL BWP may or may not be configured for sidelink transmission. When SL BWP is configured, for the Uu interface, UL BWP may be used for communication between the gNB 160 and the UE 102 and a predetermined/configured resource is used for sidelink resource pool and SL BWP is used for sidelink transmission. When SL BWP is not configured, a sidelink resource pool is defined by the PRB or subcarrier offset from Point A, or by the common resource block index, or based on the first subcarrier position of SS/PBCH block (the subcarrier with the lowest frequency of SS/PBCH block). A resource pool configuration may include a scheduling method (e.g., dynamic scheduling of a PSSCH by using PSCCH scheduling (e.g., resource via SCI or DCI) or semi-persistent scheduling of a PSSCH by using PDCCH or PSCCH activation/deactivation). Semi-persistent scheduling may be activated or deactivated via MAC-CE.

A gNB-scheduled resource allocation scheme may be called transmission mode 1 and a UE autonomous resource selection scheme may be called transmission mode 2.

A waveform and DMRS type may be configured for both PSCCH and PSSCH. The waveform and DMRS type may be separately configured for PSCCH and PSSCH. Additionally or alternately, the waveform of a PSCCH may always be CP-OFDM, and the configured/indicated waveform may be used for a PSSCH only.

Additionally or alternately, DCI may indicate all or part of the following information to a transmitter UE 102 (e.g., UE1) if the gNB 160 can control the transmitter UE 102 (in-coverage case, for instance): BWP identity (BWP ID); waveform (e.g., CP-OFDM or DFT-S-OFDM); DMRS type (e.g., DMRS type 1 and DMRS type 2 are specified in Uu interface, and which type is used for PSCCH or PSSCH); and/or the number of OFDM symbols for DMRS.

For SCI in a PSCCH, all or part of the following information may be indicated to a receiver UE 102 (e.g., UE2): MCS; scheduled resource within a resource pool (e.g., this may be a time resource pattern); DMRS type (e.g., type 1 and type 2); the number of OFDM symbols for DMRS type 1 or type 2; and/or waveform.

A time domain pattern may be defined as a bitmap ($b_0$, $b_1$, . . . , $b_L$), If $b_1$=1, the time unit for sidelink scheduling within a resource pool may be used for PSSCH transmission. On the other hand, if $b_1$=0, the time unit for sidelink scheduling within a resource pool may not be used for PSSCH transmission. Additionally or alternately, a frequency domain pattern may be defined. In this case, each bit in a bitmap of the frequency domain pattern may be applied to each PRB or each group of PRBs including a plurality of continuous/non-continuous PRBs.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for waveform configurations for V2X communication as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 is an example illustrating V2X services. A first UE 202*a* (referred to as a transmitter UE or UE1) transmits the V2X data to a second UE 202*b* (referred to as receiver UE or UE2). A base station (gNB) 260 transmits the UE data or control signal(s) to the first UE 202*a* and/or the second UE 202*b*. L1 is a radio link between gNB 260 and the first UE 202*a* (L1 may be called Uu interface), and L2 is a radio link between the first UE 202*a* and the second UE 202*b* (L2 may be called PC5 interface).

FIG. 3 illustrates an uplink-downlink timing relation. Uplink frame number i for transmission from a UE 102 may start $N_{TA}=(N_{TA}+N_{TA,offset})T_c$ before the start of the corresponding downlink frame i at the UE 102. $N_{TA,offset}$ is given by Table 7.

Figure 4:
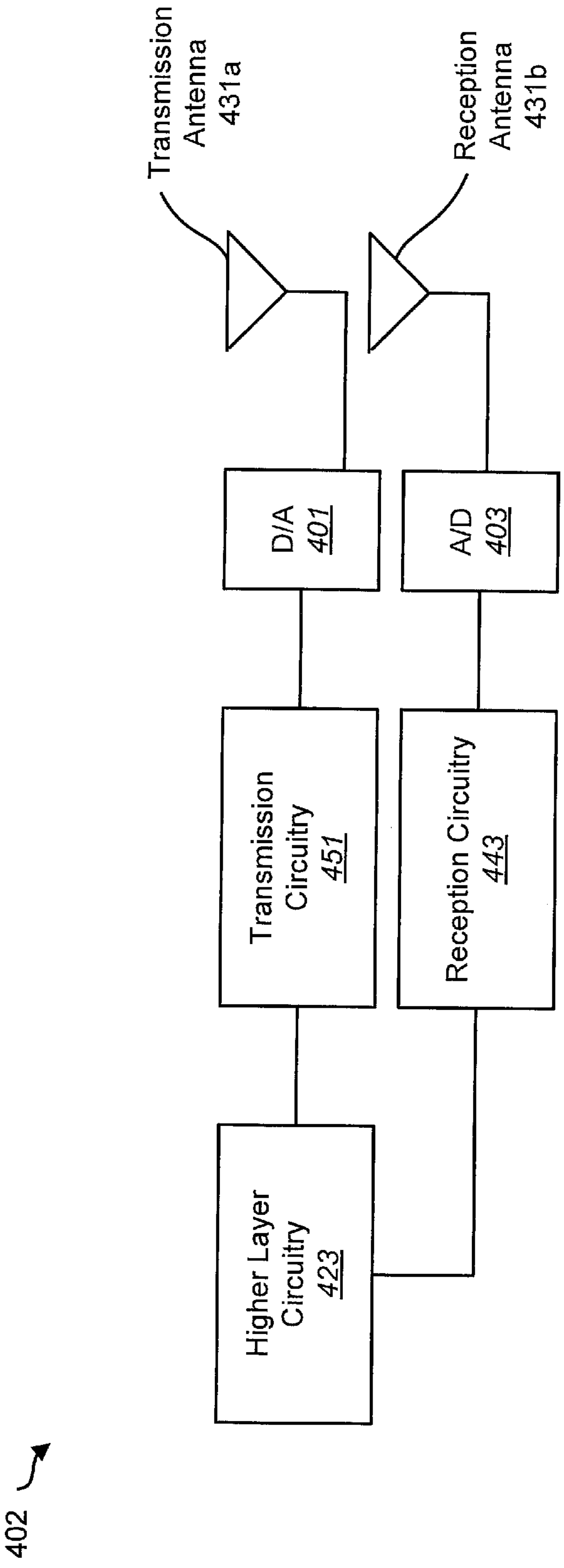
FIG. 4 is a block diagram illustrating one implementation of a UE.

FIG. 4 is a block diagram illustrating one implementation of a UE 402. The UE 402 may be implemented in accordance with a transmitter UE 102 or a receiver UE 102 as described in connection with FIG. 1.

Higher layer circuitry 423 may receive a higher layer message (e.g., SIB, dedicated RRC) from a gNB 160 or uses a preconfigured configuration by the UE 402. Transmission circuitry 451 may generate a PSCCH and a PSSCH for transmission, HARQ-ACK bit, and/or retransmission signal (s). Reception circuitry 443 may receive a PSCCH, a PSSCH, HARQ-ACK bit, and/or retransmission signal(s). A digital-to-analog converter (D/A) 401 may convert a digital signal to an analog signal, amplify the analog signal, and transmission antenna 431*a* may transmit the PSCCH and/or PSSCH. Reception antenna 431*b* may receive the transmitted signals. An analog-to-digital converter (A/D) 403 may apply AGC (automatic gain controller) values, amplify the received signals, and convert an analog signal to a digital signal. Transmission antenna 431*b* may transmit the PSCCH and/or PSSCH.

Figure 5:
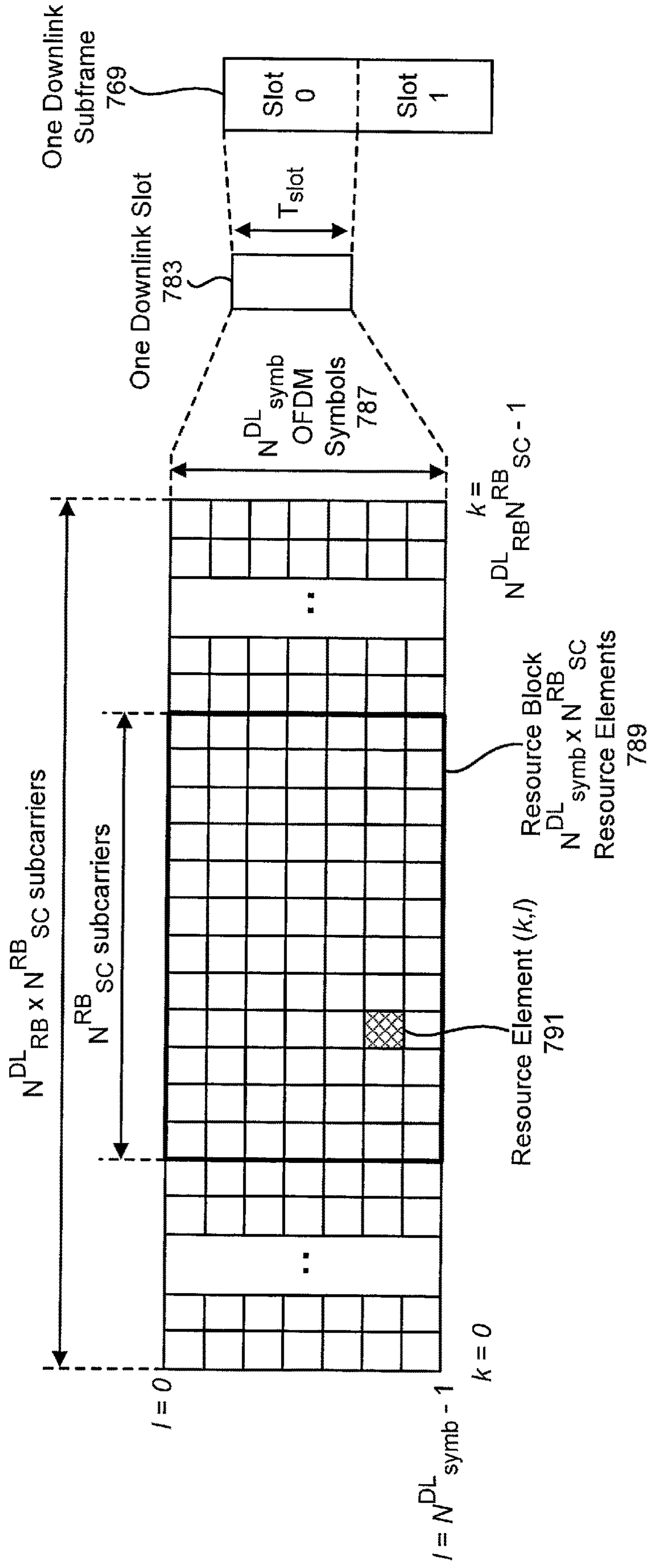
FIG. 5 is a diagram illustrating an example of a resource grid for the downlink.

FIG. 5 is a diagram illustrating one example of a resource grid for the downlink. The resource grid illustrated in FIG. 5 may be utilized in some implementations of the systems and methods disclosed herein. More detail regarding the resource grid is given in connection with FIG. 1.

In FIG. 5, one downlink subframe 769 may include two downlink slots 783. $N^{DL}_{RB}$ is downlink bandwidth configuration of the serving cell, expressed in multiples of $N^{RB}_{sc}$, where $N^{RB}_{sc}$ is a resource block 789 size in the frequency domain expressed as a number of subcarriers, and $N^{DL}_{symb}$ is the number of OFDM symbols 787 in a downlink slot 783. A resource block 789 may include a number of resource elements (RE) 791.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 791 may be the RE 791 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain. The downlink slot includes fourteen (for normal CP) or twelve (for extended CP) OFDM symbols in time domain. A region defined by one sub-carrier in frequency domain and one OFDM symbol in time domain is referred to as a resource element (RE) and is uniquely identified by the index pair (k,l) in a slot, where k and 1 are indices in the frequency and time domains, respectively. While downlink subframes in one component carrier (CC) are discussed herein, downlink subframes are defined for each CC and downlink subframes are substantially in synchronization with each other among CCs.

Figure 6:
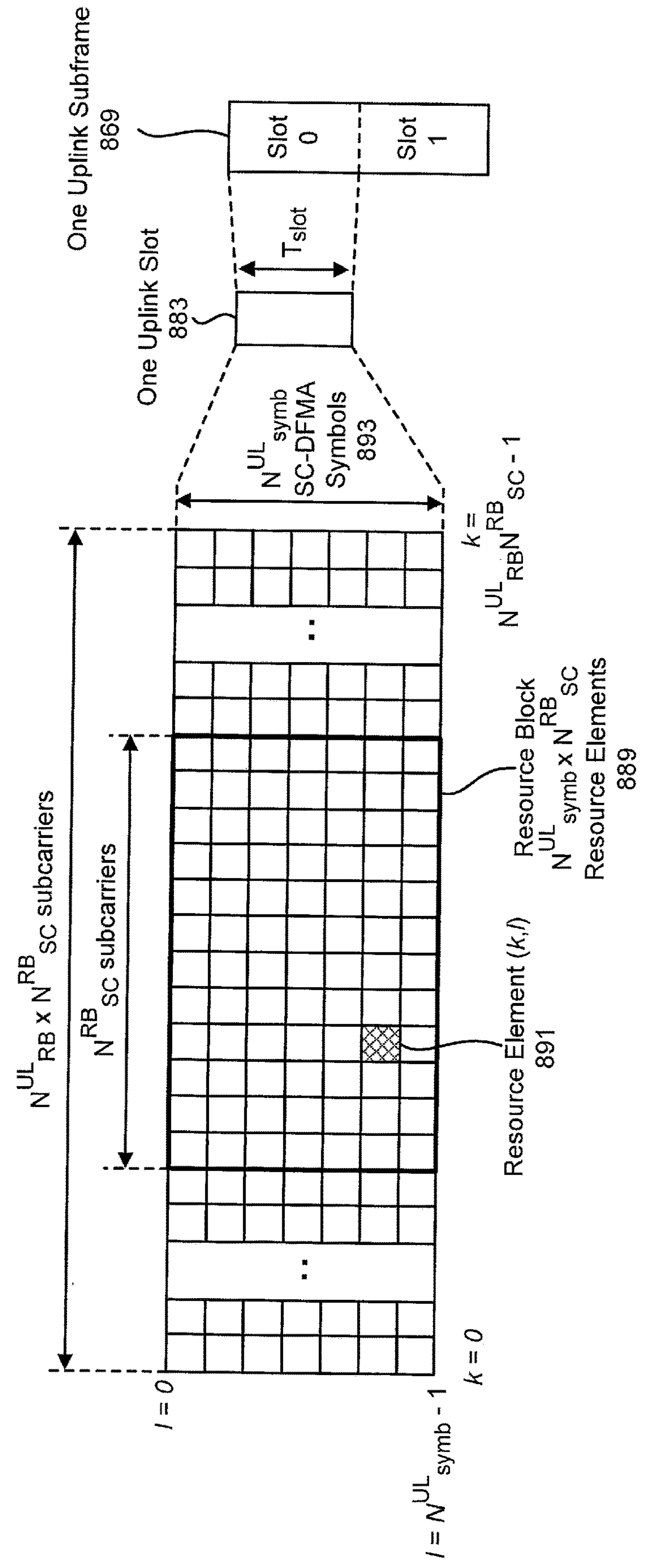
FIG. 6 is a diagram illustrating one example of a resource grid for the uplink.

FIG. 6 is a diagram illustrating one example of a resource grid for the uplink. The resource grid illustrated in FIG. 6 may be utilized in some implementations of the systems and methods disclosed herein. More detail regarding the resource grid is given in connection with FIG. 1.

In FIG. 6, one uplink subframe 869 may include two uplink slots 883. $N^{UL}_{RB}$ is uplink bandwidth configuration of the serving cell, expressed in multiples of $N^{RB}_{sc}$, where $N^{RB}_{sc}$ is a resource block 889 size in the frequency domain expressed as a number of subcarriers, and $N^{UL}_{symb}$ is the number of SC-FDMA symbols 893 in an uplink slot 883. A resource block 889 may include a number of resource elements (RE) 891.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain. The uplink slot includes fourteen (for normal CP) or twelve (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and 1 are indices in the frequency and time domains respectively. While uplink subframes in one component carrier (CC) are discussed herein, uplink subframes are defined for each CC.

Figure 7:
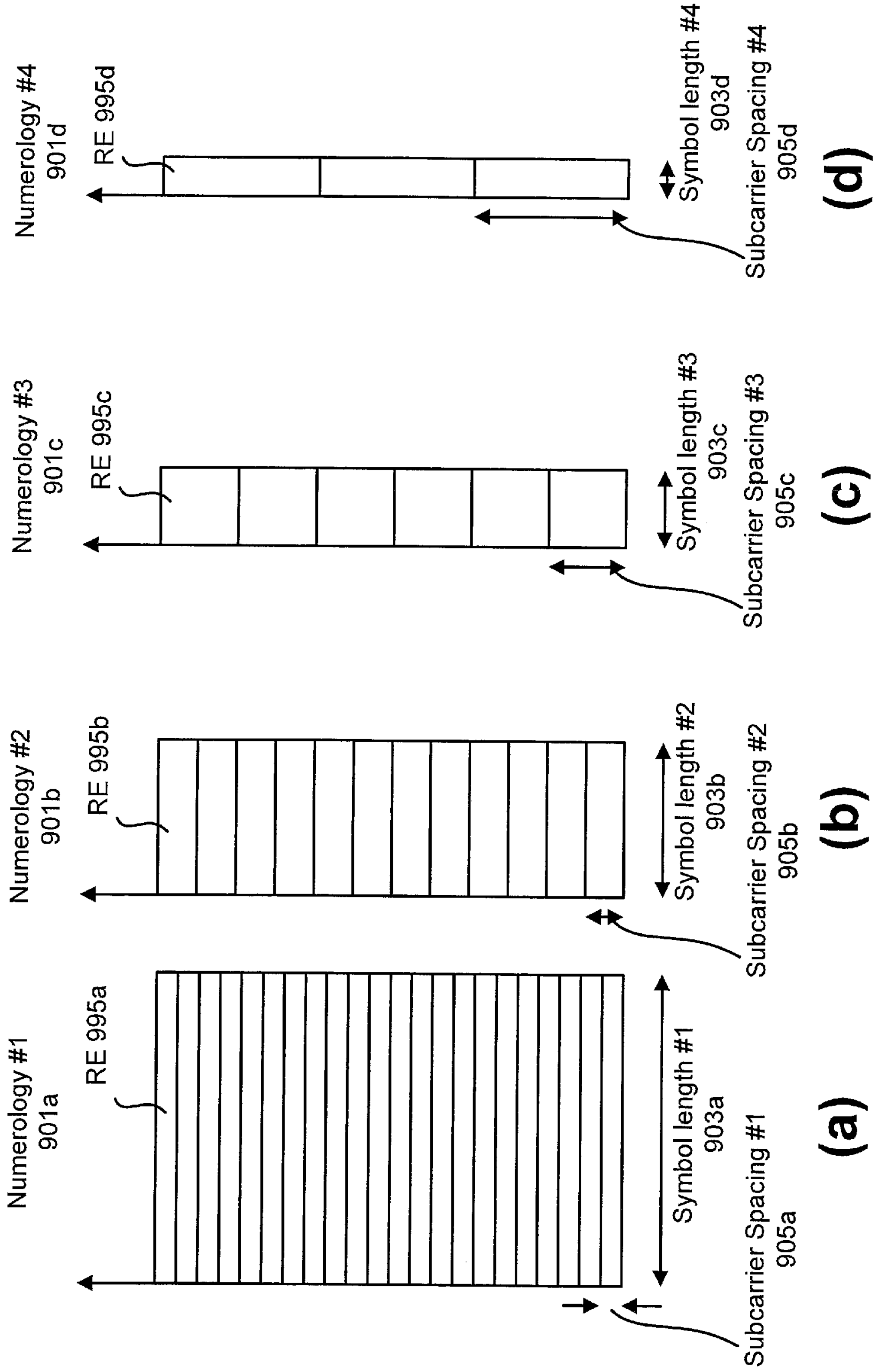
FIG. 7 shows examples of several numerologies.

FIG. 7 shows examples of several numerologies 901. The numerology #1 901*a* may be a basic numerology (e.g., a reference numerology). For example, a RE 995*a* of the basic numerology 901*a* may be defined with subcarrier spacing 905*a* of 15 kHz in frequency domain and 2048 Ts+CP length (e.g., 160 Ts or 144 Ts) in time domain (i.e., symbol length #1 903*a*), where Ts denotes a baseband sampling time unit defined as 1/(15000*2048) seconds. For the i-th numerology, the subcarrier spacing 905 may be equal to $15*2^{i}$ and the effective OFDM symbol length $2048*2^{-i}*$Ts. It may cause the symbol length is $2048*2^{-i}*$Ts+CP length (e.g., $160*2^{-i}*$Ts or $144*2^{-i}*$Ts). In other words, the subcarrier spacing of the i+1-th numerology is a double of the one for the i-th numerology, and the symbol length of the i+1-th numerology is a half of the one for the i-th numerology. FIG. 7 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 8:
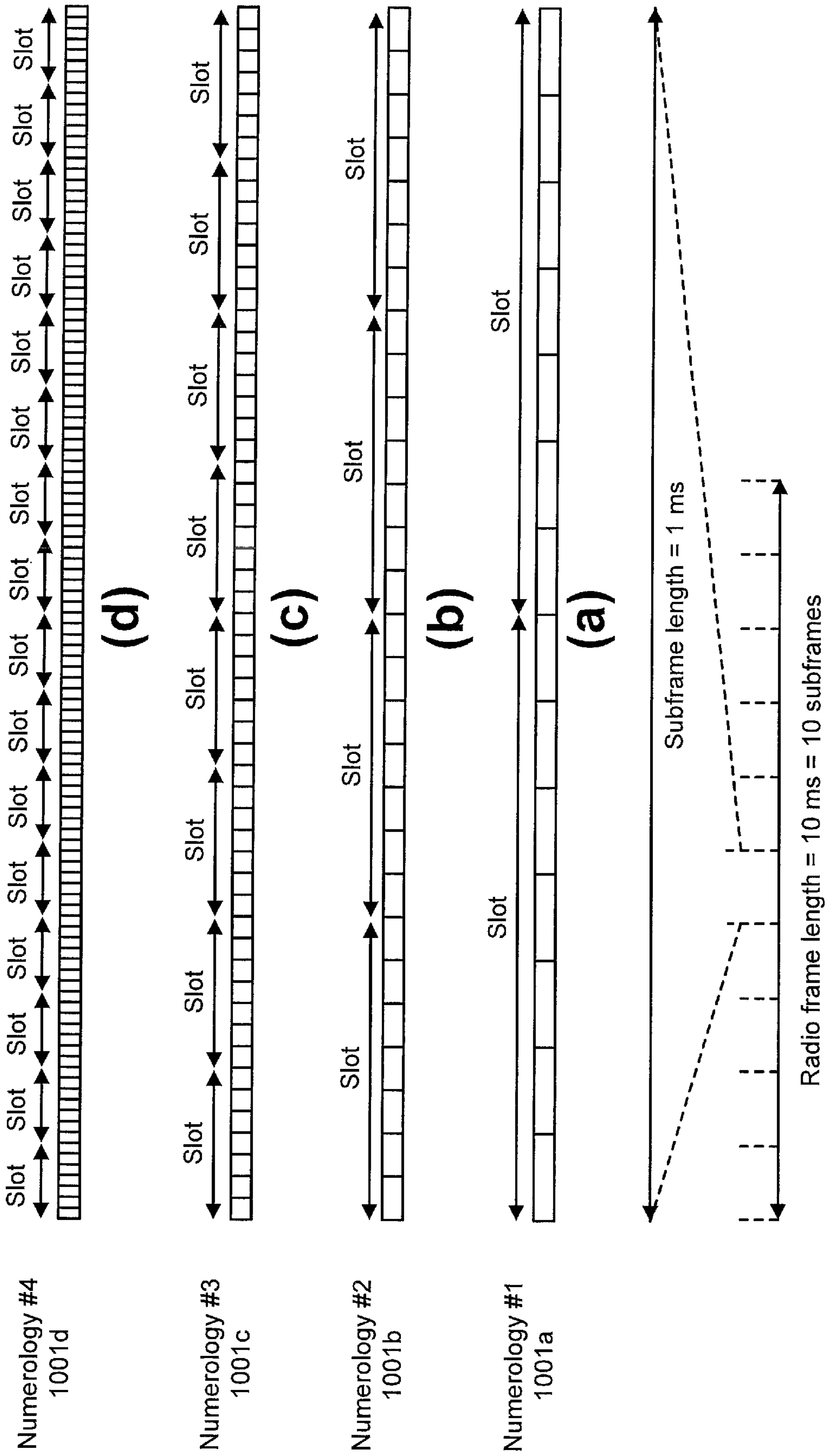
FIG. 8 shows examples of subframe structures for the numerologies that are shown in FIG. 7.

FIG. 8 shows examples of subframe structures for the numerologies 1001 that are shown in FIG. 7. Given that a slot 1083 includes $N^{DL}_{symb}$ (or $N^{UL}_{symb}$)=7 symbols, the slot length of the i+1-th numerology 1001 is a half of the one for the i-th numerology 1001, and eventually the number of slots 1083 in a subframe (i.e., 1 ms) becomes double. It may be noted that a radio frame may include 10 subframes, and the radio frame length may be equal to 10 ms.

Figure 9:
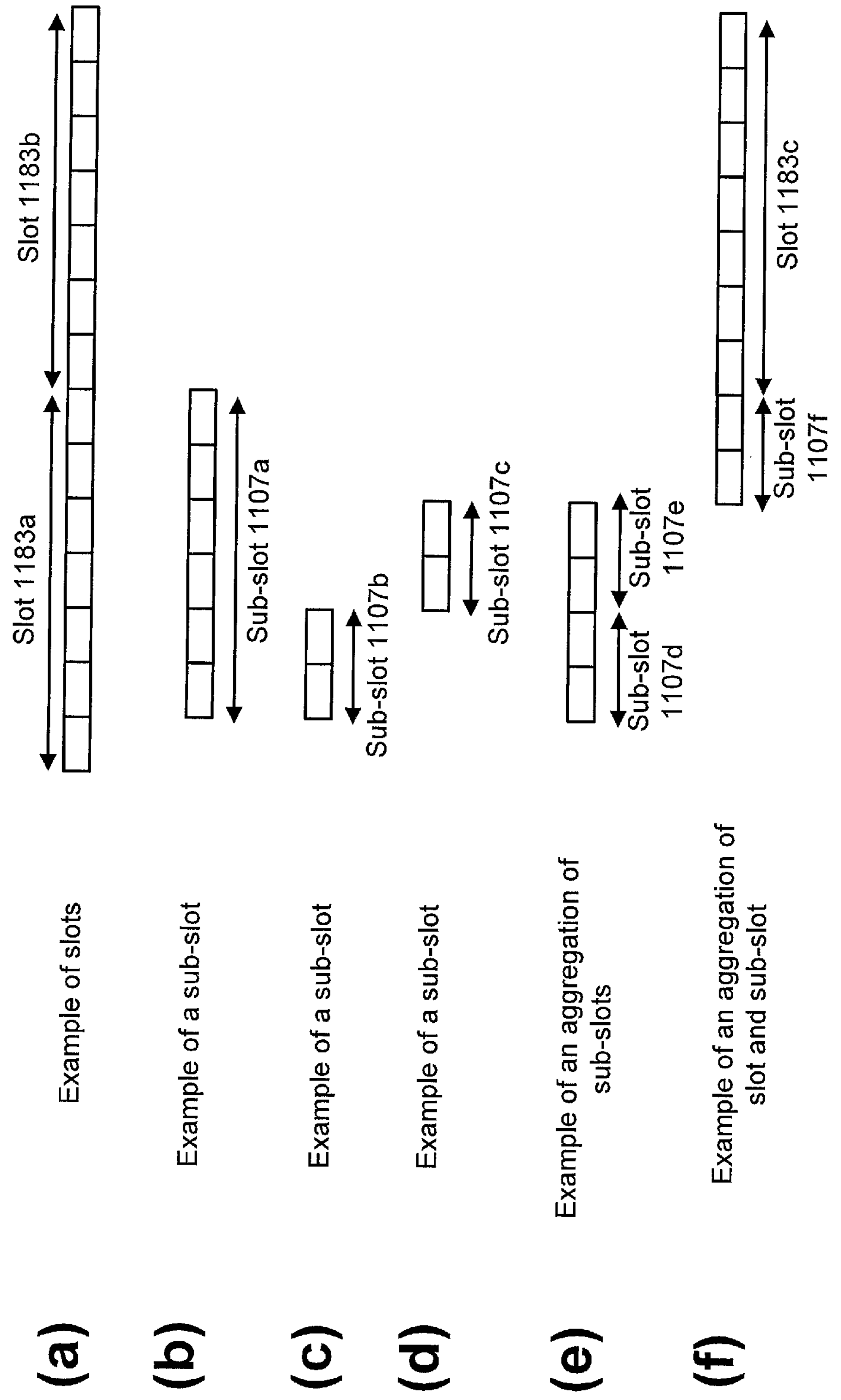
FIG. 9 shows examples of slots and sub-slots.

FIG. 9 shows examples of slots 1183 and sub-slots 1107. If a sub-slot 1107 is not configured by higher layer, the UE 102 and the eNB/gNB 160 may only use a slot 1183 as a scheduling unit. More specifically, a given transport block may be allocated to a slot 1183. If the sub-slot 1107 is configured by higher layer, the UE 102 and the eNB/gNB 160 may use the sub-slot 1107 as well as the slot 1183. The sub-slot 1107 may include one or more OFDM symbols. The maximum number of OFDM symbols that constitute the sub-slot 1107 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1107 may start at any symbol within a slot 1183 unless it collides with a control channel. There could be restrictions of mini-slot length based on restrictions on starting position. For example, the sub-slot 1107 with the length of $N^{DL}_{symb}-1$ (or $N^{UL}_{symb}-1$) may start at the second symbol in a slot 1183. The starting position of a sub-slot 1107 may be indicated by a physical layer control channel (e.g., by DCI format). Alternatively, the starting position of a sub-slot 1107 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1107. Here, a slot may be called "PDSCH type A", "PUSCH type A", or "PSSCH type A". A mini-slot may be called "PDSCH type B", "PUSCH type B", or "PSSCH type B". This may be defined as the position of DMRS in the time domain. For example, DMRS of PSSCH type A may be mapped to the $3^{rd}$ or $4^{th}$ OFDM symbol in a slot, and DMRS of PSSCH type B may be mapped to the first OFDM symbol of the scheduled OFDM symbol(s).

In cases when the sub-slot 1107 is configured, a given transport block may be allocated to either a slot 1183, a sub-slot 1107, aggregated sub-slots 1107 or aggregated sub-slot(s) 1107 and slot 1183. This unit may also be a unit for HARQ-ACK bit generation.

Figure 10:
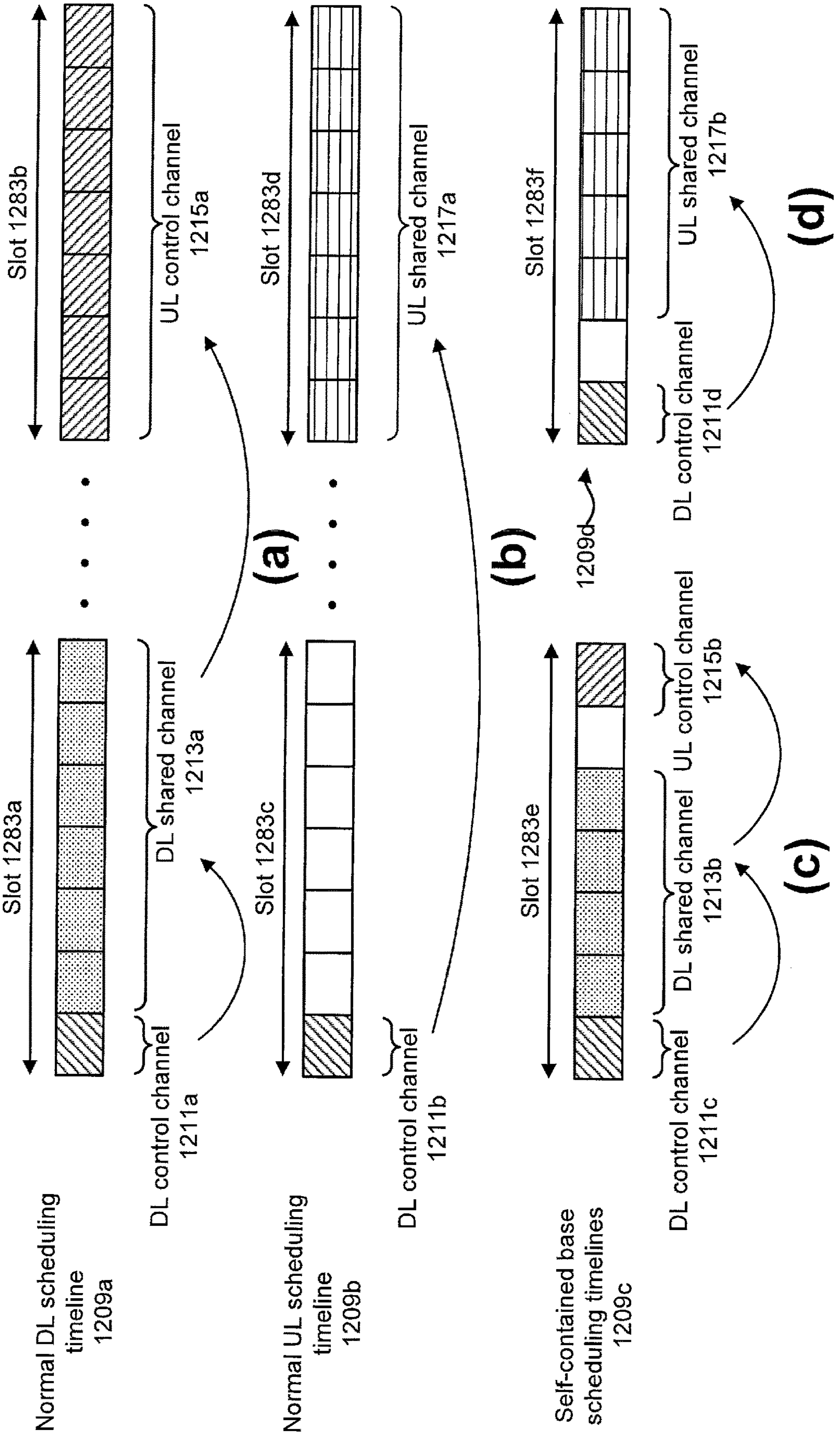
FIG. 10 shows examples of scheduling timelines.

FIG. 10 shows examples of scheduling timelines 1209. For a normal DL scheduling timeline 1209*a*, DL control channels are mapped the initial part of a slot 1283*a*. The DL control channels 1211 schedule DL shared channels 1213*a* in the same slot 1283*a*. HARQ-ACKs for the DL shared channels 1213*a* (i.e., HARQ-ACKs each of which indicates whether or not transport block in each DL shared channel 1213*a* is detected successfully) are reported via UL control channels 1215*a* in a later slot 1283*b*. In this instance, a given slot 1283 may contain either one of DL transmission and UL transmission.

For a normal UL scheduling timeline 1209*b*, DL control channels 1211*b* are mapped the initial part of a slot 1283*c*. The DL control channels 1211*b* schedule UL shared channels 1217*a* in a later slot 1283*d*. For these cases, the association timing (time shift) between the DL slot 1283*c* and the UL slot 1283*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1209*c*, DL control channels 1211*c* are mapped to the initial part of a slot 1283*e*. The DL control channels 1211*c* schedule DL shared channels 1213*b* in the same slot 1283*e*. HARQ-ACKs for the DL shared channels 1213*b* are reported in UL control channels 1215*b*, which are mapped at the ending part of the slot 1283*e*.

For a self-contained base UL scheduling timeline 1209*d*, DL control channels 1211*d* are mapped to the initial part of a slot 1283*f*. The DL control channels 1211*d* schedule UL shared channels 1217*b* in the same slot 1283*f*. For these cases, the slot 1283*f* may contain DL and UL portions, and there may be a guard period between the DL and UL transmissions.

The use of a self-contained slot may be upon a configuration of self-contained slot. Alternatively, the use of a self-contained slot may be upon a configuration of the subslot. Yet alternatively, the use of a self-contained slot may be upon a configuration of shortened physical channel (e.g., PDSCH, PUSCH, PUCCH, etc.).

Figure 11:
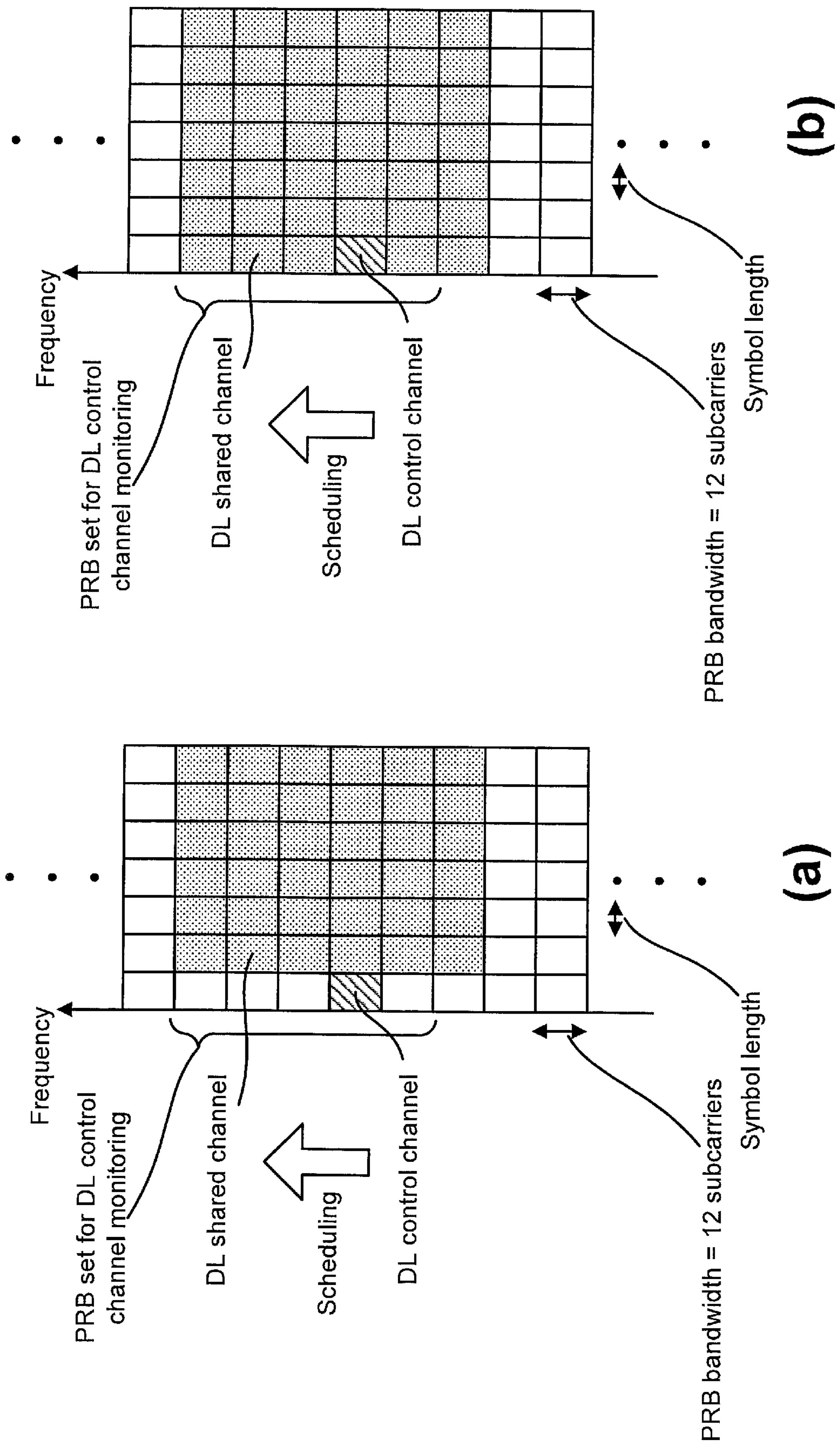
FIG. 11 shows examples of DL control channel monitoring regions.

FIG. 11 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 12:
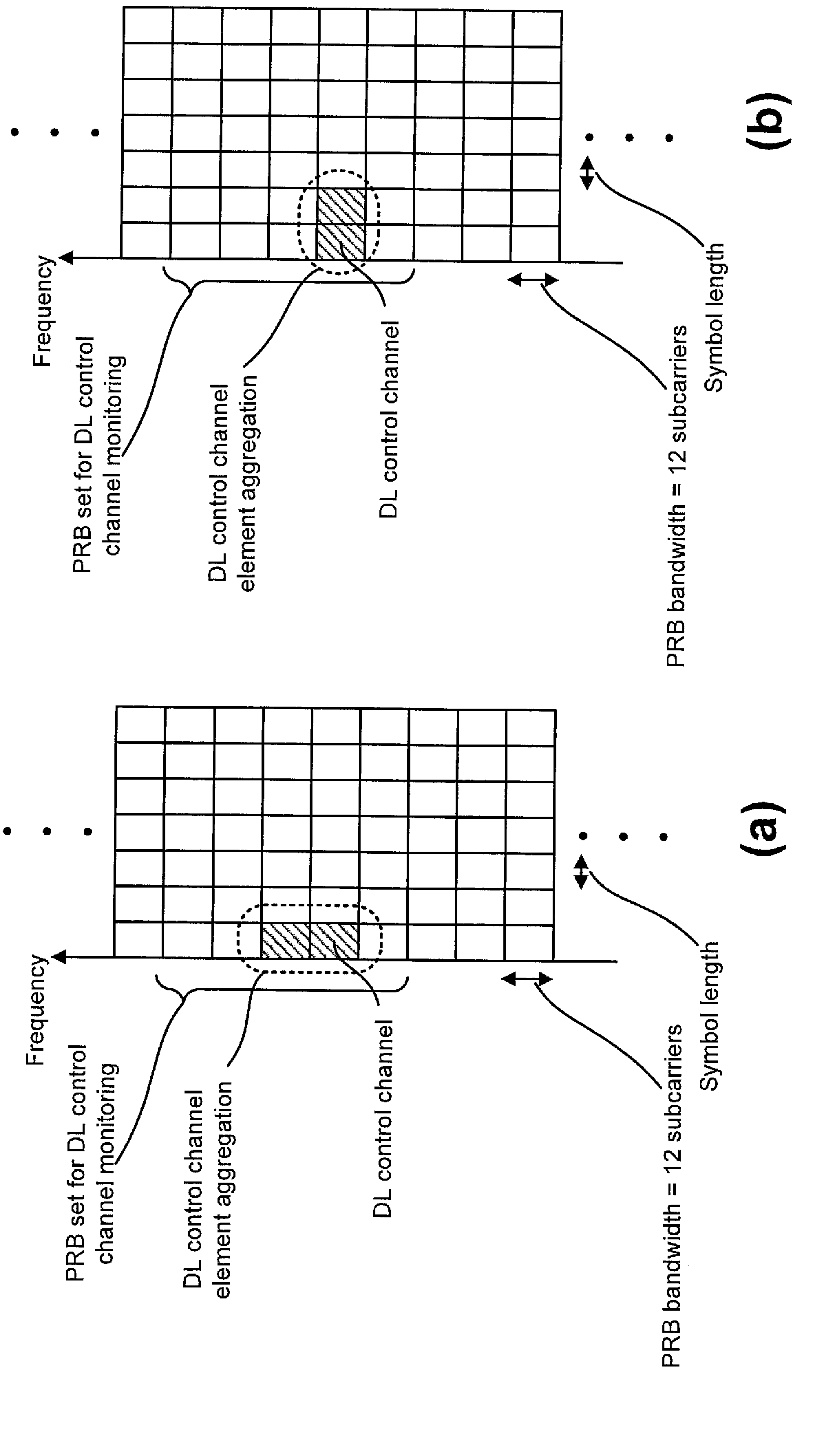
FIG. 12 shows examples of DL control channel which includes more than one control channel elements.

FIG. 12 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 13:
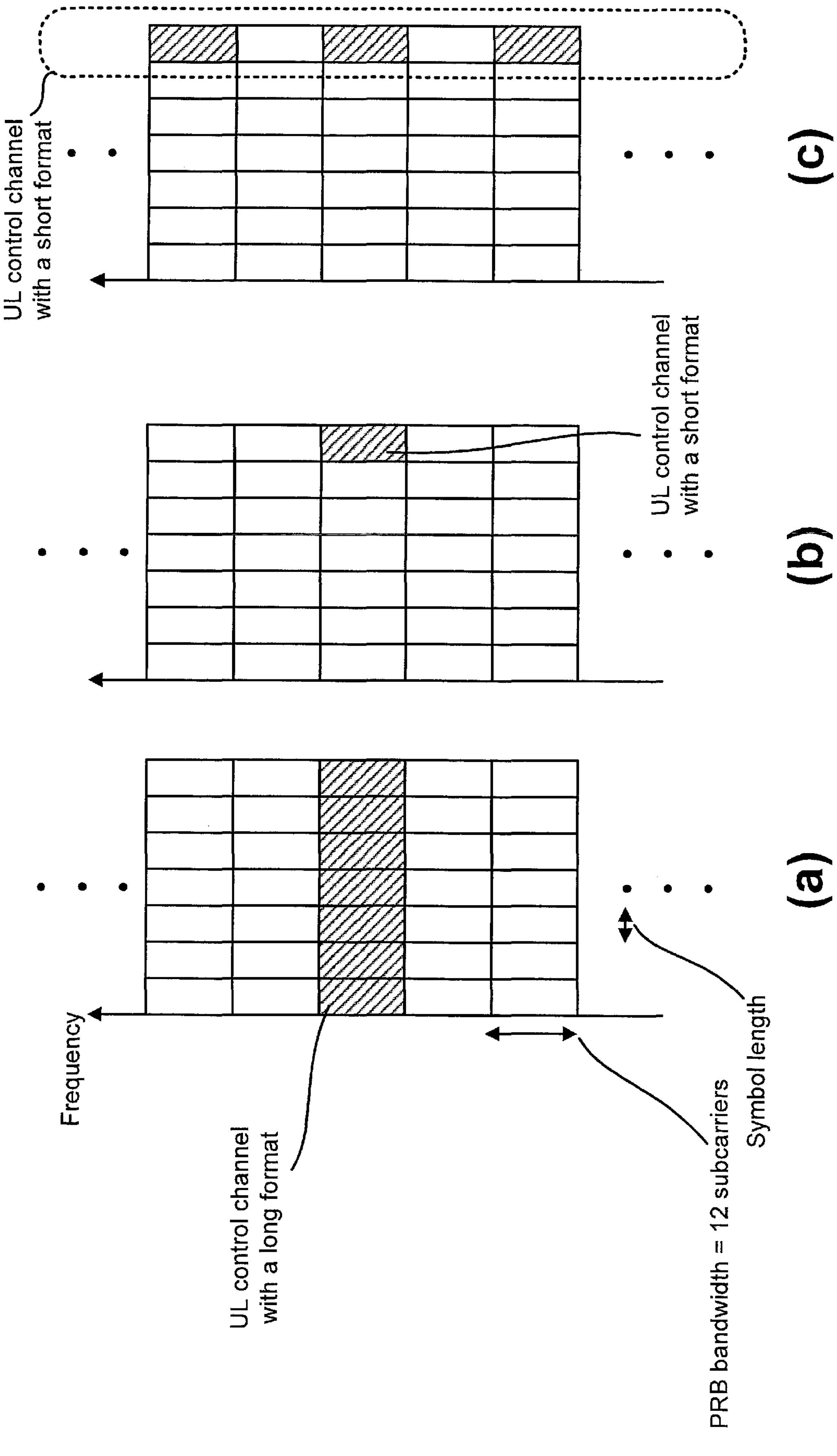
FIG. 13 shows examples of UL control channel structures.

FIG. 13 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRB s. For example, interlaced mapping may be applied, namely the UL control channel may be mapped to every N PRBs (e.g. 5 or 10) within a system bandwidth.

Figure 14:
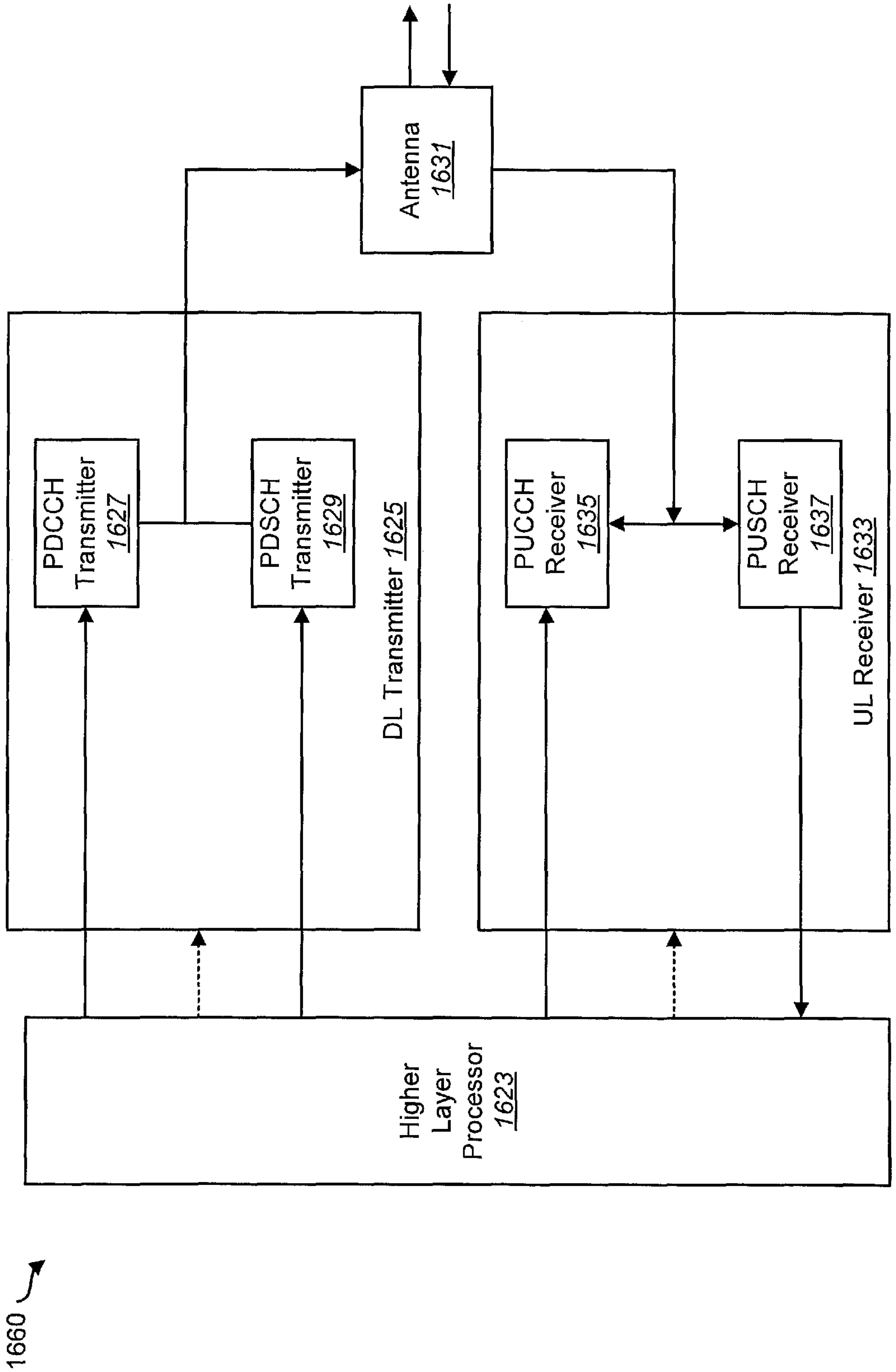
FIG. 14 is a block diagram illustrating one implementation of a gNB.

FIG. 14 is a block diagram illustrating one implementation of a gNB 1660. The gNB 1660 may include a higher layer processor 1623, a DL transmitter 1625, a UL receiver 1633, and one or more antenna 1631. The DL transmitter 1625 may include a PDCCH transmitter 1627 and a PDSCH transmitter 1629. The UL receiver 1633 may include a PUCCH receiver 1635 and a PUSCH receiver 1637.

The higher layer processor 1623 may manage physical layer's behaviors (the DL transmitter's and the UL receiver's behaviors) and provide higher layer parameters to the physical layer. The higher layer processor 1623 may obtain transport blocks from the physical layer. The higher layer processor 1623 may send/acquire higher layer messages such as an RRC message and MAC message to/from a UE's higher layer. The higher layer processor 1623 may provide the PDSCH transmitter transport blocks and provide the PDCCH transmitter transmission parameters related to the transport blocks.

The DL transmitter 1625 may multiplex downlink physical channels and downlink physical signals (including reservation signal) and transmit them via transmission antennas 1631. The UL receiver 1633 may receive multiplexed uplink physical channels and uplink physical signals via receiving antennas 1631 and de-multiplex them. The PUCCH receiver 1635 may provide the higher layer processor 1623 UCI. The PUSCH receiver 1637 may provide the higher layer processor 1623 received transport blocks.

Figure 15:
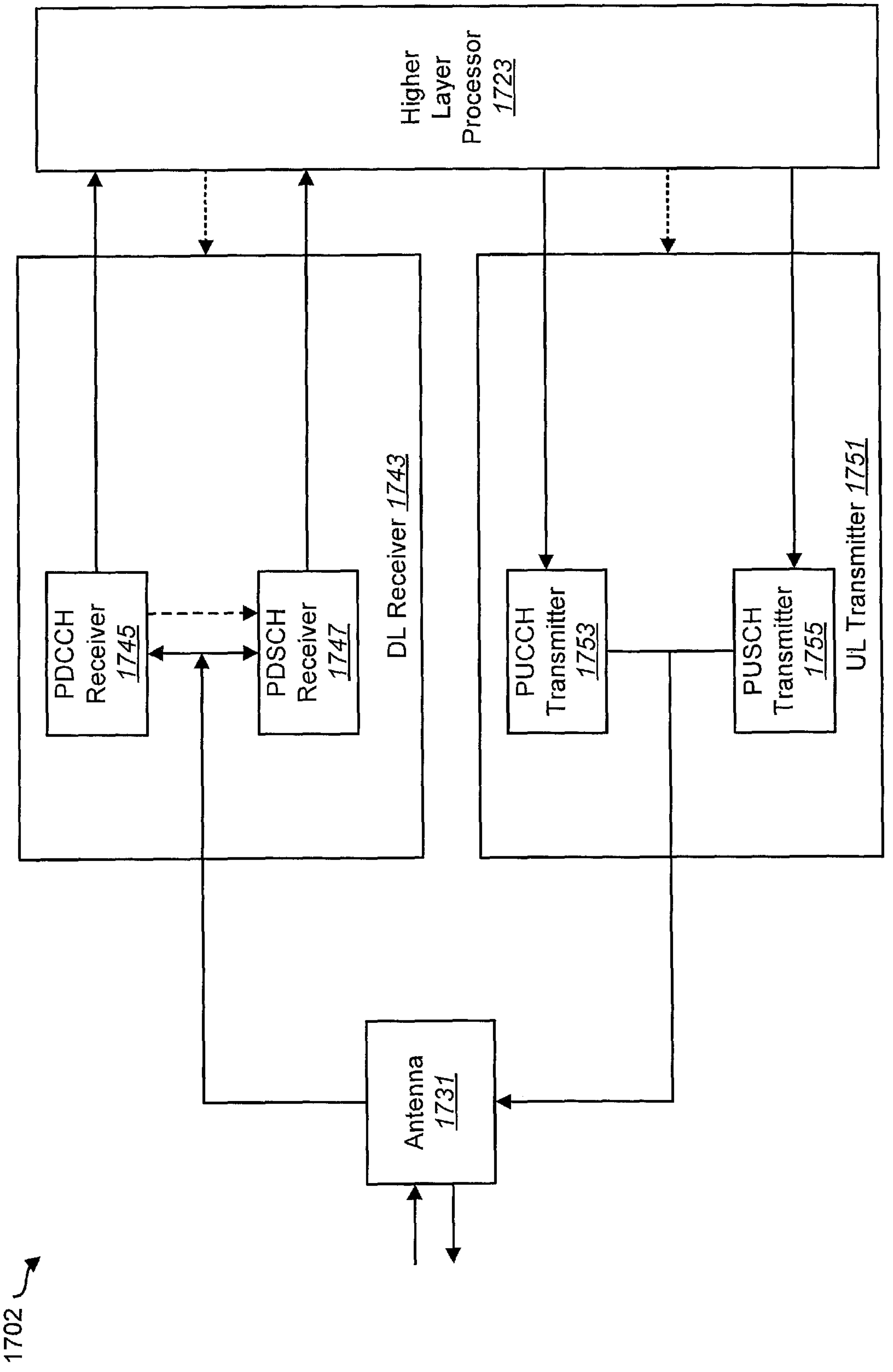
FIG. 15 is a block diagram illustrating one implementation of a UE.

FIG. 15 is a block diagram illustrating one implementation of a UE 1702. The UE 1702 may include a higher layer processor 1723, a UL transmitter 1751, a DL receiver 1743, and one or more antenna 1731. The UL transmitter 1751 may include a PUCCH transmitter 1753 and a PUSCH transmitter 1755. The DL receiver 1743 may include a PDCCH receiver 1745 and a PDSCH receiver 1747.

The higher layer processor 1723 may manage physical layer's behaviors (the UL transmitter's and the DL receiver's behaviors) and provide higher layer parameters to the physical layer. The higher layer processor 1723 may obtain transport blocks from the physical layer. The higher layer processor 1723 may send/acquire higher layer messages such as an RRC message and MAC message to/from a UE's higher layer. The higher layer processor 1723 may provide the PUSCH transmitter transport blocks and provide the PUCCH transmitter 1753 UCI.

The DL receiver 1743 may receive multiplexed downlink physical channels and downlink physical signals via receiving antennas 1731 and de-multiplex them. The PDCCH receiver 1745 may provide the higher layer processor 1723 DCI. The PDSCH receiver 1747 may provide the higher layer processor 1723 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 16:
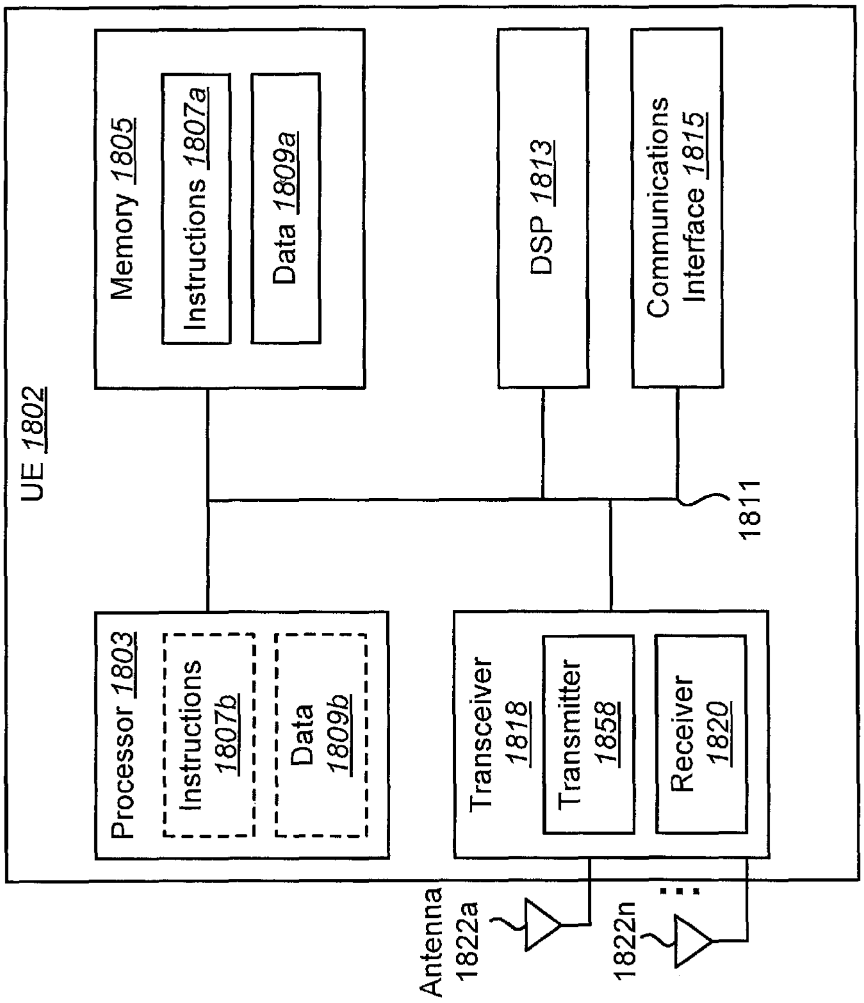
FIG. 16 illustrates various components that may be utilized in a UE.

FIG. 16 illustrates various components that may be utilized in a UE 1802. The UE 1802 described in connection with FIG. 16 may be implemented in accordance with the UE 102 described in connection with FIG. 1. The UE 1802 includes a processor 1803 that controls operation of the UE 1802. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random-access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807b may be executed by the processor 1803 to implement the methods described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822a-n are attached to the housing and electrically coupled to the transceiver 1818.

The various components of the UE 1802 are coupled together by a bus system 1811, which may include a power bus, a control signal bus and a status signal bus, in addition to a data bus. However, for the sake of clarity, the various buses are illustrated in FIG. 16 as the bus system 1811. The UE 1802 may also include a digital signal processor (DSP) 1813 for use in processing signals. The UE 1802 may also include a communications interface 1815 that provides user access to the functions of the UE 1802. The UE 1802 illustrated in FIG. 16 is a functional block diagram rather than a listing of specific components.

Figure 17:
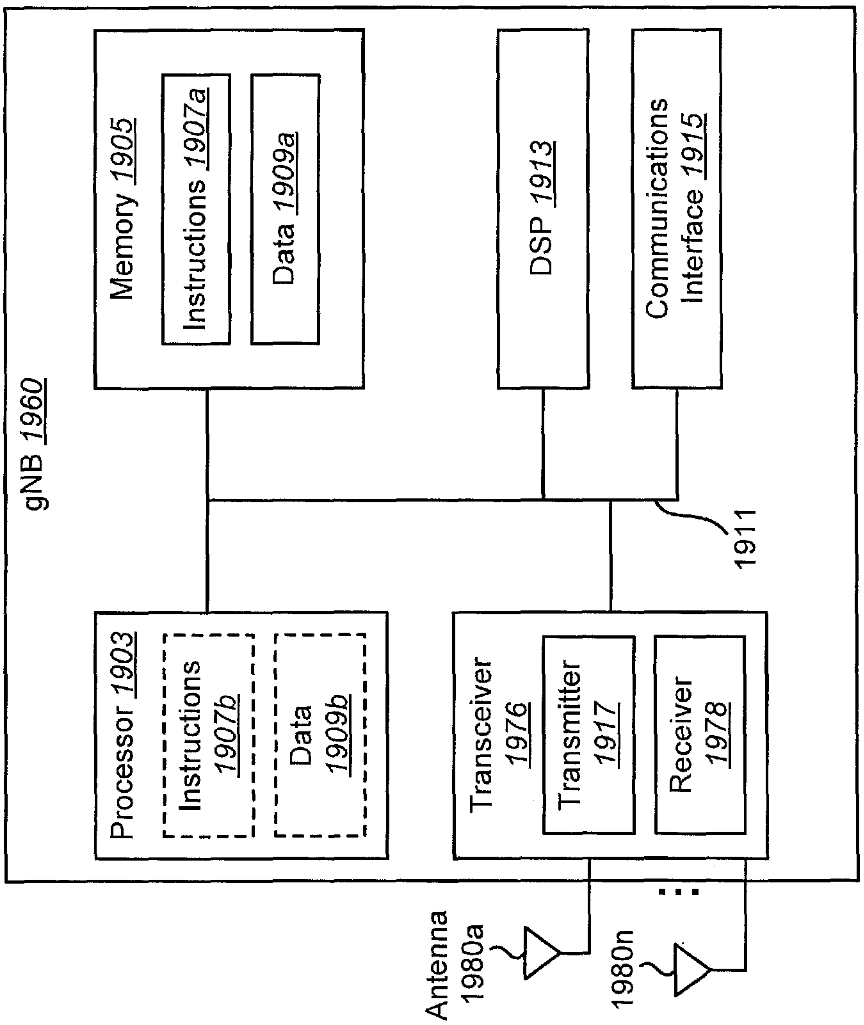
FIG. 17 illustrates various components that may be utilized in a gNB.

FIG. 17 illustrates various components that may be utilized in a gNB 1960. The gNB 1960 described in connection with FIG. 17 may be implemented in accordance with the gNB 160 described in connection with FIG. 1. The gNB 1960 includes a processor 1903 that controls operation of the gNB 1960. The processor 1903 may also be referred to as a central processing unit (CPU). Memory 1905, which may include read-only memory (ROM), random access memory (RAM), a combination of the two or any type of device that may store information, provides instructions 1907a and data 1909a to the processor 1903. A portion of the memory 1905 may also include nonvolatile random-access memory (NVRAM). Instructions 1907b and data 1909b may also reside in the processor 1903. Instructions 1907b and/or data 1909b loaded into the processor 1903 may also include instructions 1907a and/or data 1909a from memory 1905 that were loaded for execution or processing by the processor 1903. The instructions 1907b may be executed by the processor 1903 to implement the methods described above.

The gNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980a-n are attached to the housing and electrically coupled to the transceiver 1976.

The various components of the gNB 1960 are coupled together by a bus system 1911, which may include a power bus, a control signal bus and a status signal bus, in addition to a data bus. However, for the sake of clarity, the various buses are illustrated in FIG. 17 as the bus system 1911. The gNB 1960 may also include a digital signal processor (DSP) 1913 for use in processing signals. The gNB 1960 may also include a communications interface 1915 that provides user access to the functions of the gNB 1960. The gNB 1960 illustrated in FIG. 17 is a functional block diagram rather than a listing of specific components.

Figure 18:
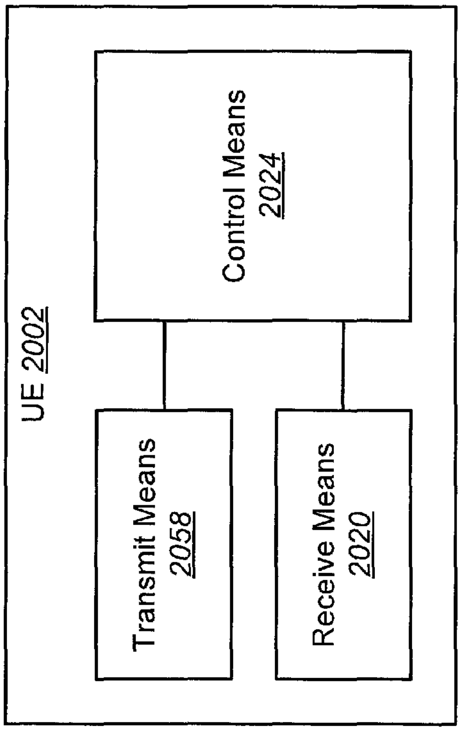
FIG. 18 is a block diagram illustrating one implementation of a UE in which waveform configurations for V2X communication may be implemented

FIG. 18 is a block diagram illustrating one implementation of a UE 2002 in which waveform configurations for V2X communication may be implemented. The UE 2002 includes transmit means 2058, receive means 2020 and control means 2024. The transmit means 2058, receive means 2020 and control means 2024 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
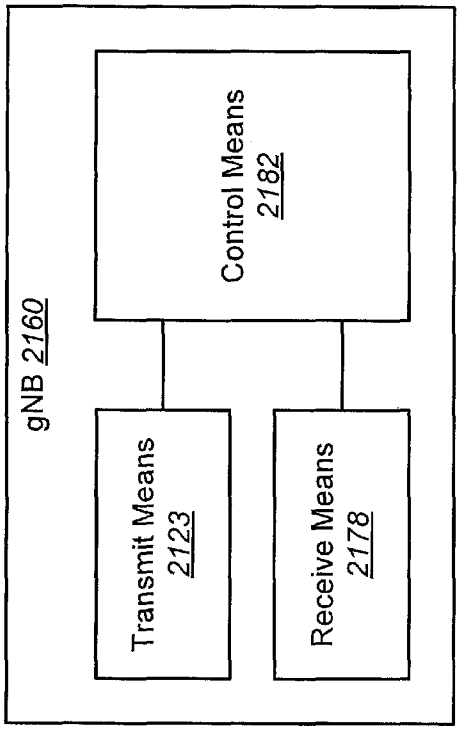
FIG. 19 is a block diagram illustrating one implementation of a gNB in which waveform configurations for V2X communication may be implemented.

FIG. 19 is a block diagram illustrating one implementation of a gNB 2160 in which waveform configurations for V2X communication may be implemented. The gNB 2160 includes transmit means 2123, receive means 2178 and control means 2182. The transmit means 2123, receive means 2178 and control means 2182 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed.

Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

SUMMARY

In one example, a user equipment (UE), comprising: higher layer circuitry configured to receive information on a resource pool for sidelink; transmitting circuitry configured to transmit a physical sidelink control channel (PSCCH) and a physical sidelink shared channel (PSSCH), wherein the information on the resource pool includes information on whether a transmission precoding is enabled or disabled; and the transmitting circuitry is configured to transmit the PSSCH based on whether the transmission precoding is enabled or disabled.

In one example, a base station (gNB), comprising: transmitting circuitry configured to transmit information on a resource pool for sidelink; and receiving circuitry configured to receive a physical sidelink control channel (PSCCH) and a physical sidelink shared channel (PSSCH), wherein the information on the resource pool includes information on whether a transmission precoding is enabled or disabled; and the receiving circuitry is configured to receive the PSSCH based on whether the transmission precoding is enabled or disabled.

In one example, a communication method by a user equipment (UE), comprising: receiving information on a resource pool for sidelink; transmitting a physical sidelink control channel (PSCCH) and a physical sidelink shared channel (PSSCH), wherein the information on the resource pool includes information on whether a transmission precoding is enabled or disabled; and transmitting the PSSCH based on whether the transmission precoding is enabled or disabled.

In one example, a communication method by a base station (gNB), comprising: transmitting information on a resource pool for sidelink; receiving a physical sidelink control channel (PSCCH) and a physical sidelink shared channel (PSSCH), wherein the information on the resource pool includes information on whether a transmission precoding is enabled or disabled; and receiving the PSSCH based on whether the transmission precoding is enabled or disabled.

In one example, a user equipment (UE), comprising: higher layer circuitry configured to receive information to configure a sidelink bandwidth part (BWP) and second information to configure one or more resource pool for sidelink transmission and/or reception; transmitting circuitry configured to transmit a physical sidelink control channel (PSCCH) and a physical sidelink shared channel (PSSCH), wherein subcarrier spacing is associated with the sidelink BWP, and a demodulation reference signal configuration for the PSCCH and PSSCH is configured for each of the one or more resource pools.

In one example, a base station (gNB), comprising: higher layer circuitry configured to transmit information to configure a sidelink bandwidth part (BWP) and second information to configure one or more resource pool for sidelink communication; wherein subcarrier spacing is associated with the sidelink BWP, and a demodulation reference signal configuration for the PSCCH and PSSCH is configured for each of the one or more resource pools.

In one example, a communication method by a user equipment (UE), comprising: receiving information to configure a sidelink bandwidth part (BWP) and second information to configure one or more resource pool for sidelink transmission and/or reception; transmitting a physical sidelink control channel (PSCCH) and a physical sidelink shared channel (PSSCH), wherein subcarrier spacing is associated with the sidelink BWP, and a demodulation reference signal configuration for the PSCCH and PSSCH is configured for each of the one or more resource pools.

In one example, a communication method by a base station (gNB), comprising: transmitting information to configure a sidelink bandwidth part (BWP) and second information to configure one or more resource pool for sidelink communication; wherein subcarrier spacing is associated with the sidelink BWP, and a demodulation reference signal configuration for the PSCCH and PSSCH is configured for each of the one or more resource pools.

CROSS REFERENCE

This Nonprovisional application claims priority under 35 U.S.C. § 119 on provisional Application No. 62/737,777 on Sep. 27, 2018, the entire contents of which are hereby incorporated by reference.

What is claimed is:

1. A user equipment (UE), comprising:

higher layer circuitry configured to receive first information to configure a sidelink bandwidth part (BWP) and second information to configure one or more resource pools for sidelink transmission and/or reception; and transmitting circuitry configured to transmit a physical sidelink control channel (PSCCH) and a physical sidelink shared channel (PSSCH), wherein the first information configures a subcarrier spacing, the second information configures, for each of the one or more resource pools, a demodulation reference signal configuration for the PSCCH and the PSSCH, the PSCCH is used for indicating sidelink control information (SCI), the SCI indicates resource allocation information of one or more resources for the PSSCH, the PSSCH is used for transmitting sidelink shared channel (SL-SCH), and the SL-SCH is V2X data.

2. A base station (BS), comprising:

higher layer circuitry configured to transmit first information to configure a sidelink bandwidth part (BWP) and second information to configure one or more resource pools for sidelink communication, wherein the first information configures a subcarrier spacing, the second information configures, for each of the one or more resource pools, a demodulation reference signal configuration for a physical sidelink control channel (PSCCH) and a physical sidelink shared channel (PSSCH), the PSCCH is used for indicating sidelink control information (SCI), the SCI indicates resource allocation information of one or more resources for the PSSCH, the PSSCH is used for transmitting sidelink shared channel (SL-SCH), and the SL-SCH is V2X data.

3. A communication method performed by a user equipment (UE), the communication method comprising:

receiving first information to configure a sidelink bandwidth part (BWP) and second information to configure one or more resource pools for sidelink transmission and/or reception; and transmitting a physical sidelink control channel (PSCCH) and a physical sidelink shared channel (PSSCH), wherein the first information configures a subcarrier spacing, the second information configures, for each of the one or more resource pools, a demodulation reference signal configuration for the PSCCH and the PSSCH, the PSCCH is used for indicating sidelink control information (SCI), the SCI indicates resource allocation information of one or more resources for the PSSCH, the PSSCH is used for transmitting sidelink shared channel (SL-SCH), and the SL-SCH is V2X data.

4. A communication method performed by a base station (BS), the communication method comprising:

transmitting first information to configure a sidelink bandwidth part (BWP) and second information to configure one or more resource pools for sidelink communication, wherein the first information configures a subcarrier spacing, the second information configures, for each of the one or more resource pools, a demodulation reference signal configuration for a physical sidelink control channel (PSCCH) and a physical sidelink shared channel (PSSCH), the PSCCH is used for indicating sidelink control information (SCI), the SCI indicates resource allocation information of one or more resources for the PSSCH, the PSSCH is used for transmitting sidelink shared channel (SL-SCH), and the SL-SCH is V2X data.

* * * * *